United States Patent [19]

Lakes

[11] 4,366,618

[45] Jan. 4, 1983

[54] APPARATUS FOR WINDING ARMATURES OF ELECTRIC MACHINES

[76] Inventor: Lee J. Lakes, 1023 Sherwood Dr., Bluffton, Ind. 46714

[21] Appl. No.: 165,375

[22] Filed: Jul. 2, 1980

[51] Int. Cl.³ .................. B23P 23/00; B65H 81/00
[52] U.S. Cl. ................................ 29/735; 29/33 L; 29/564.5; 242/7.04; 242/7.03
[58] Field of Search .............. 29/33 L, 564.5, 735, 29/597; 242/7.03, 7.04, 7.05 R, 7.05 A, 7.05 B

[56] References Cited

U.S. PATENT DOCUMENTS

| | | | |
|---|---|---|---|
| 1,662,881 | 3/1928 | Chapman | 242/7.05 A |
| 2,074,366 | 3/1937 | Collins et al. | 29/564.5 |
| 2,284,373 | 5/1942 | Cullin | 29/735 X |
| 2,916,222 | 12/1959 | Farmer | 242/7.03 |
| 3,156,037 | 11/1964 | Warner | 29/564.5 |
| 3,187,784 | 6/1965 | Caldwell | 29/735 X |
| 3,395,449 | 8/1968 | Moore | 29/735 X |
| 4,052,783 | 10/1977 | Shively | 29/735 X |

*Primary Examiner*—Lowell A. Larson
*Attorney, Agent, or Firm*—Gust, Irish, Jeffers & Hoffman

[57] ABSTRACT

Armatures for electric machines of the direct current type conventionally include a slotted core and commutator on a common shaft. This apparatus is for winding coils in the core slots and for connecting the coil leads to the commutator. The commutator is provided with bars and risers and the risers with slots. The apparatus includes a supporting frame and a support on the frame for holding an armature in winding position. Lead-connecting mechanism is mounted on the frame adjacent to the armature support in juxtaposition to the commutator of the armature for locating two coil leads in two riser slots, respectively. The lead-connecting mechanism is further supported for limited rotational movement about the axis of the armature shaft. Coil-winding mechanism is provided on the frame for winding a coil on the core of the armature.

The lead-connecting mechanism includes a coil lead guide device having two lead-aligning sections laterally spaced a distance corresponding to the spacing between two adjacent slots in the commutator riser. The lead-aligning sections are disposed radially opposite the riser with said sections being in alignment with the two adjacent riser slots. Further, means are provided for locating the two end leads of the coil wound on the core in the lead-aligning sections in radial alignment with the two riser slots, respectively. Two lead-inserting devices as a part of the lead-connecting mechanism are mounted for selective movement into and out of said two riser slots for inserting the coil leads into the slots, respectively.

34 Claims, 83 Drawing Figures

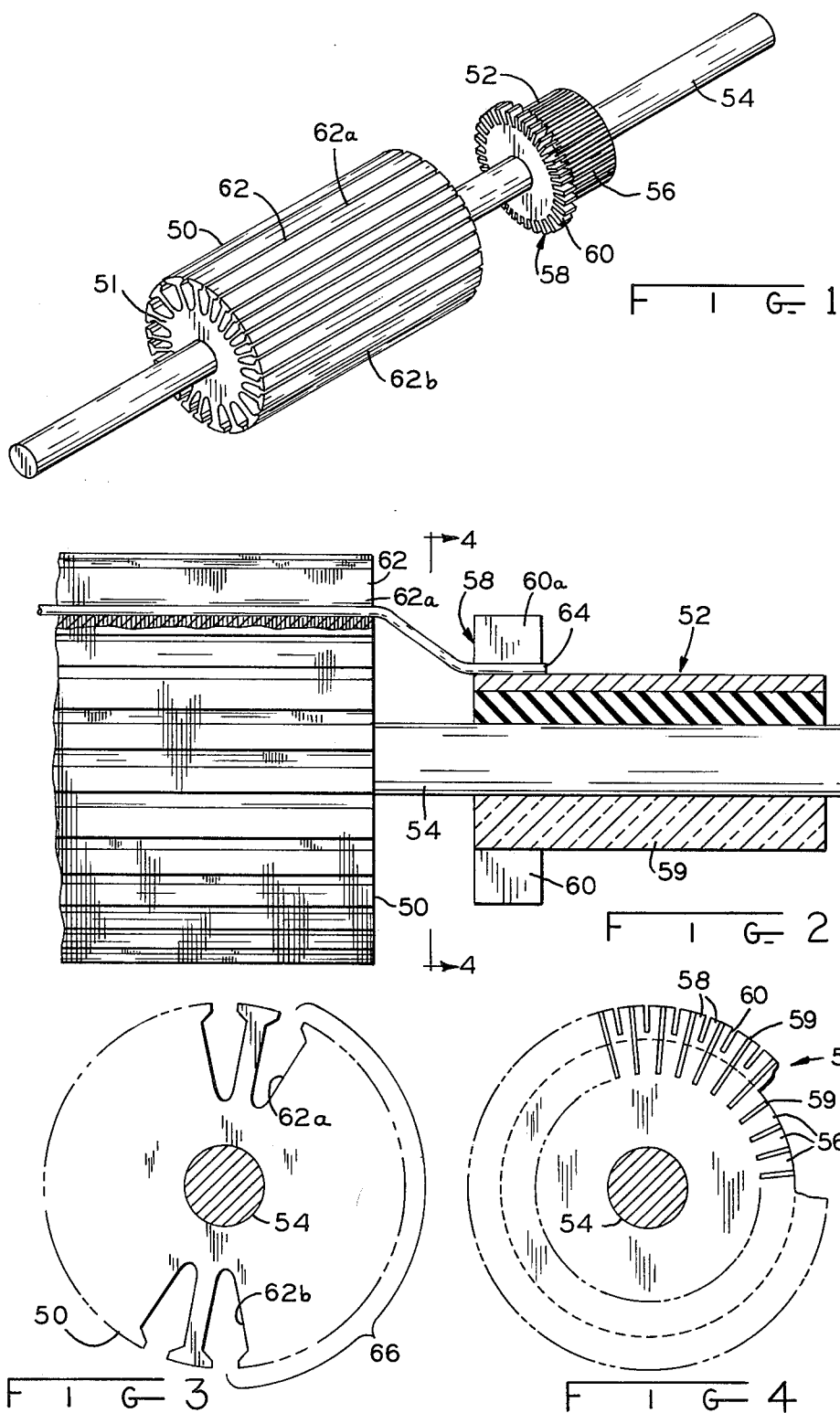

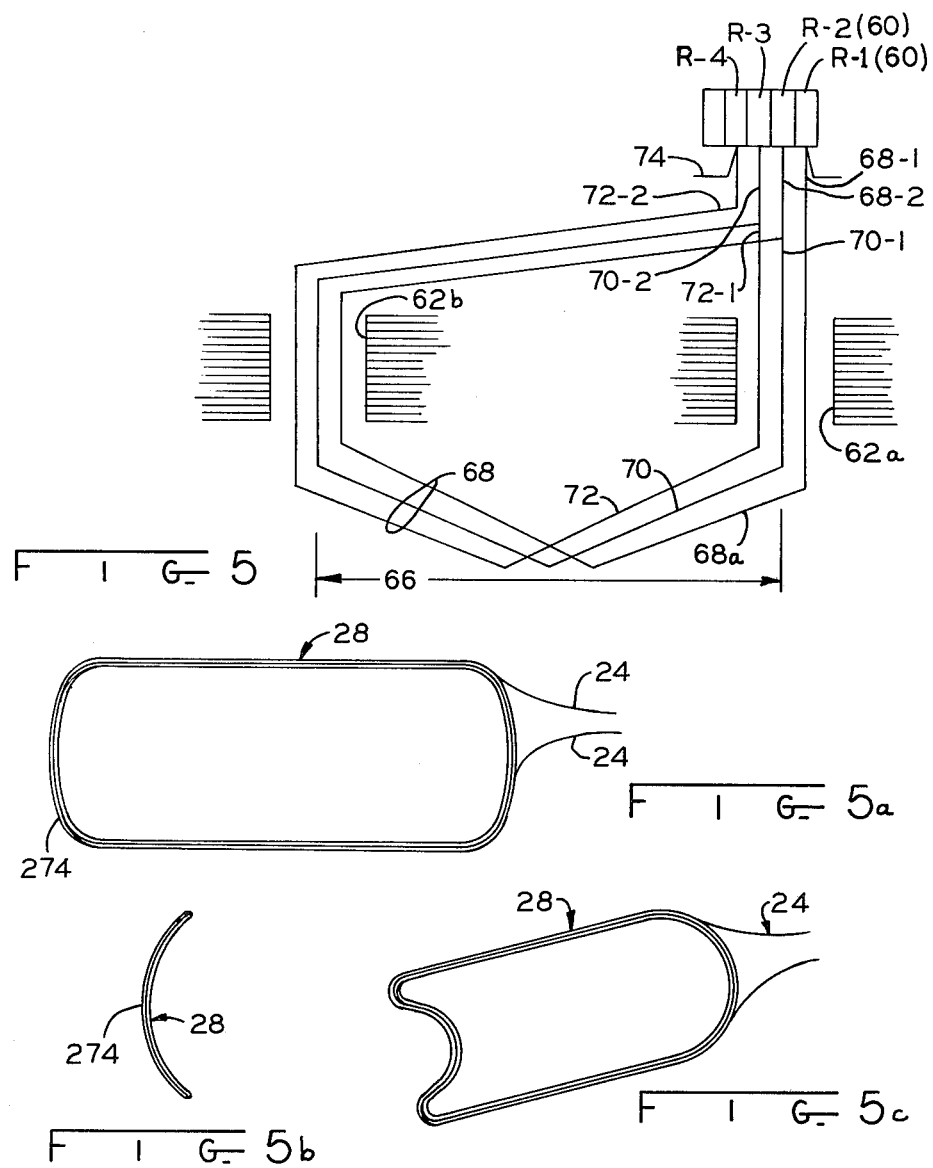

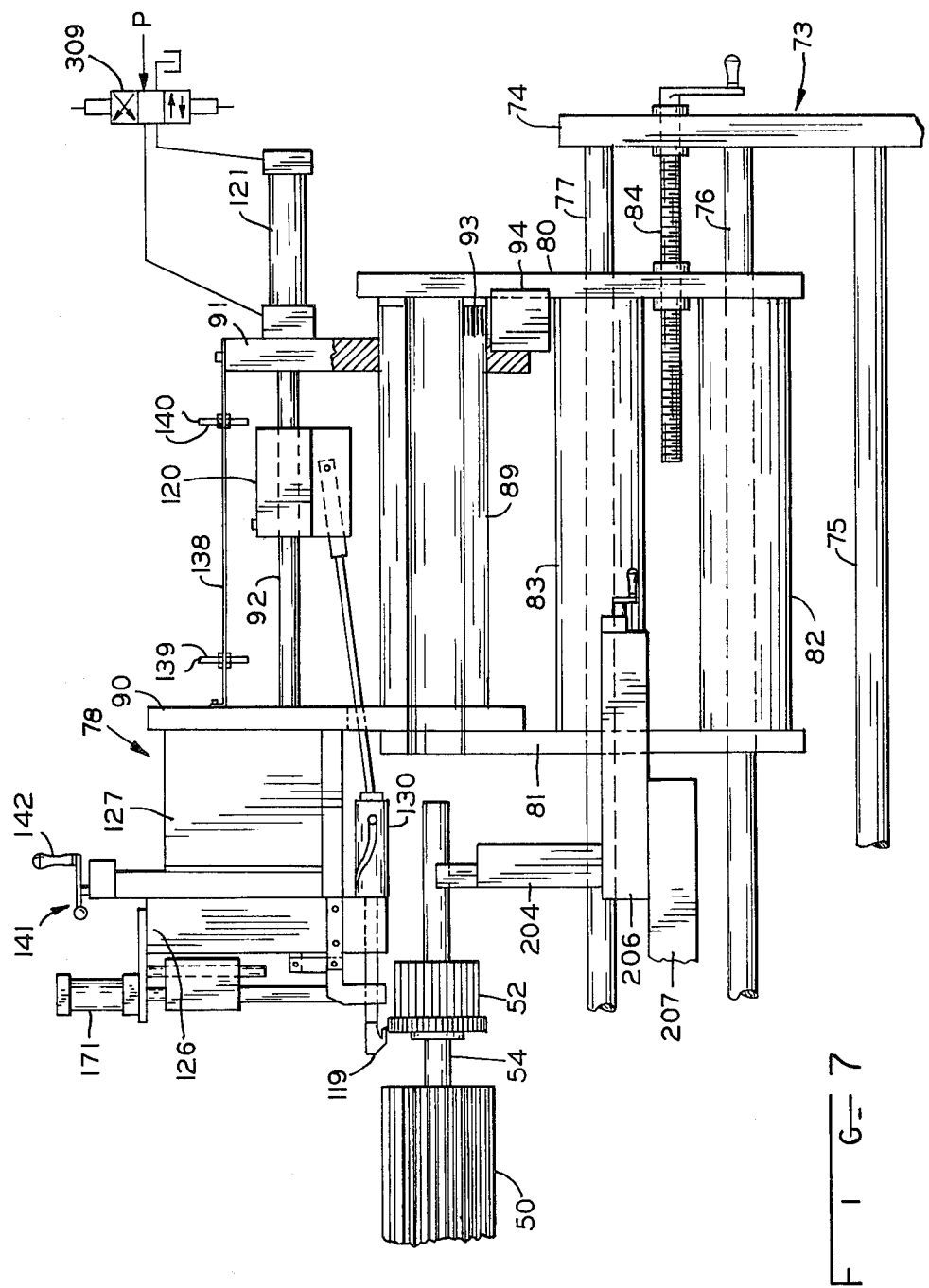

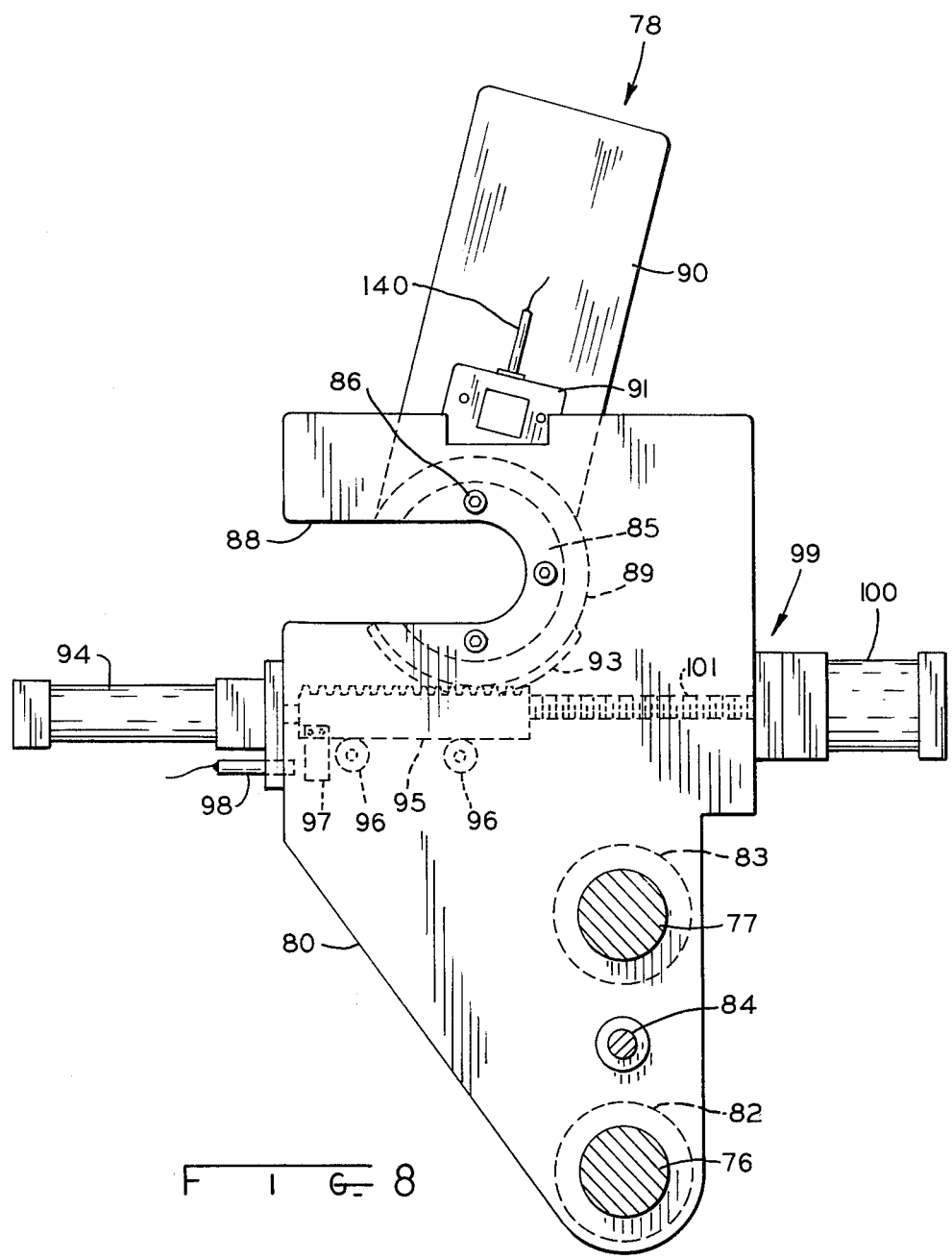

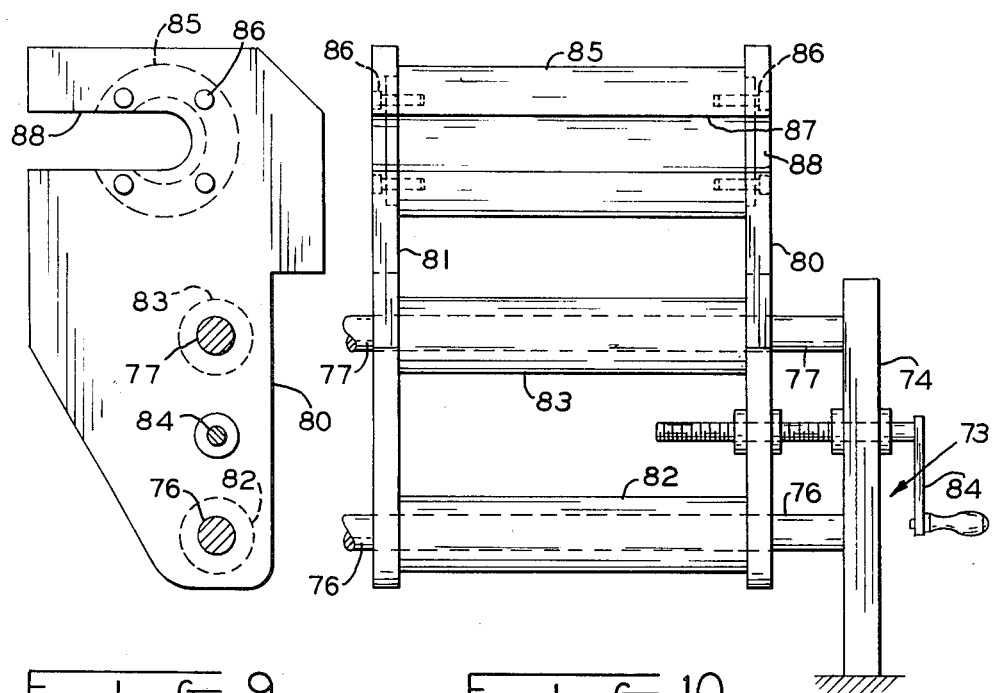
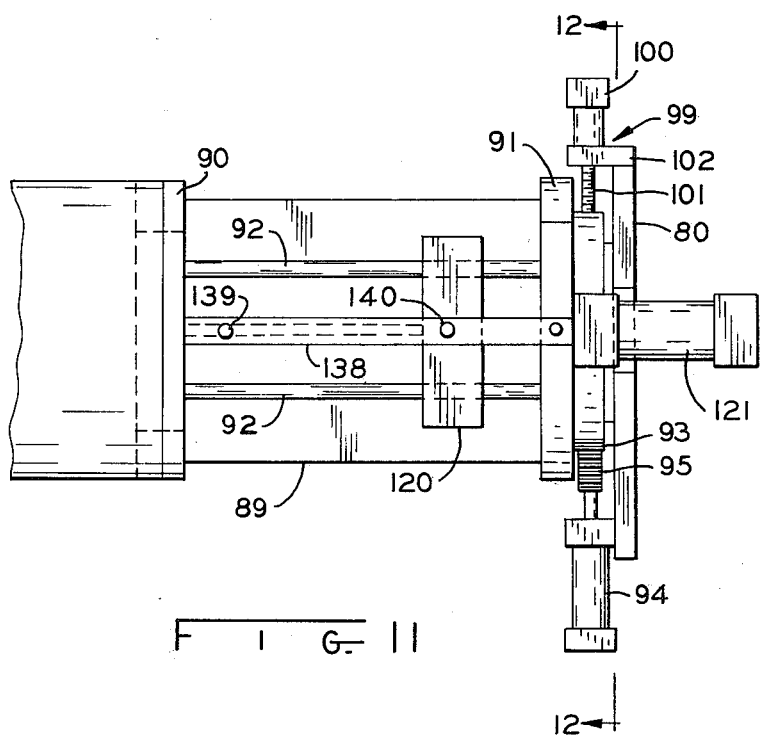

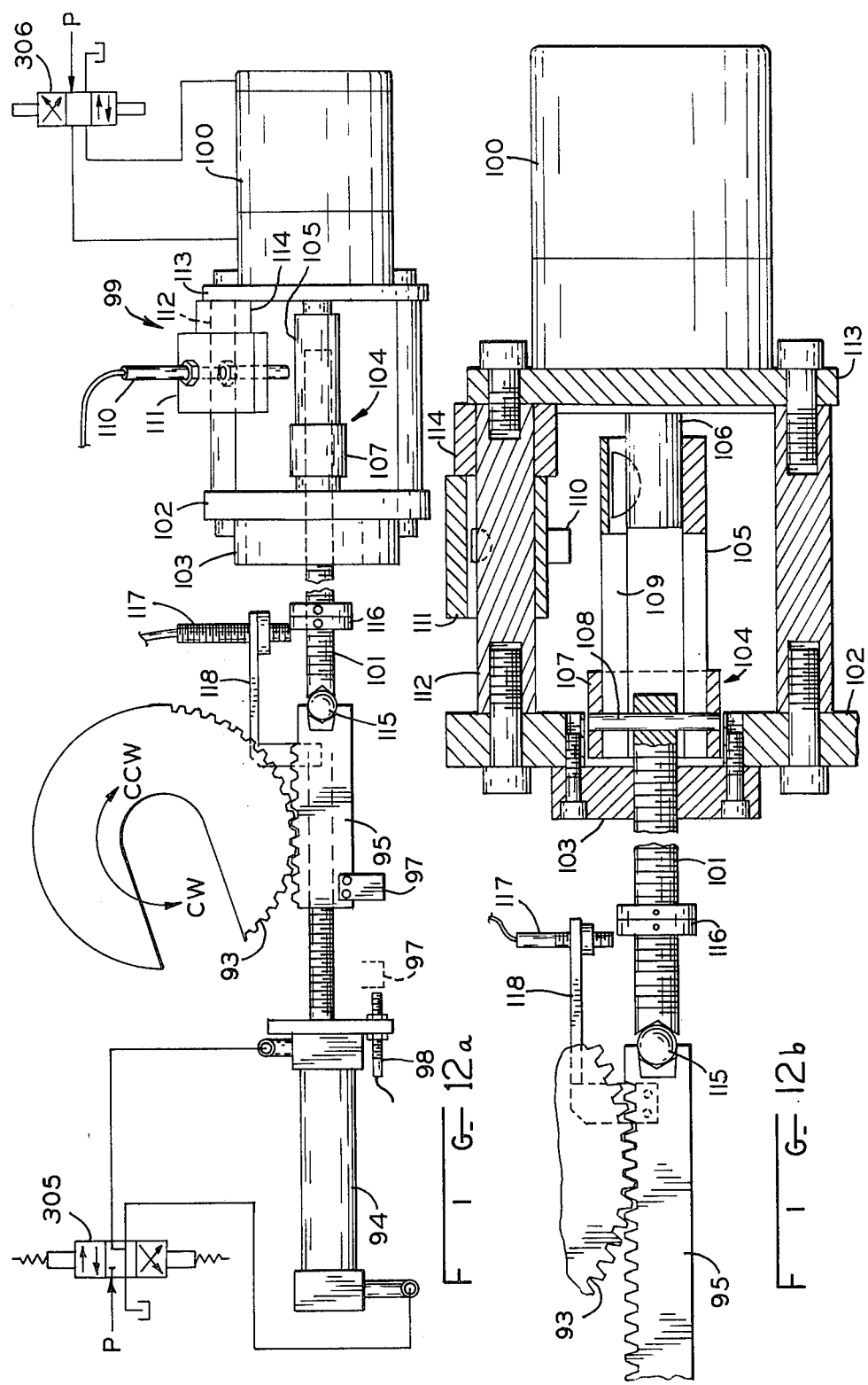

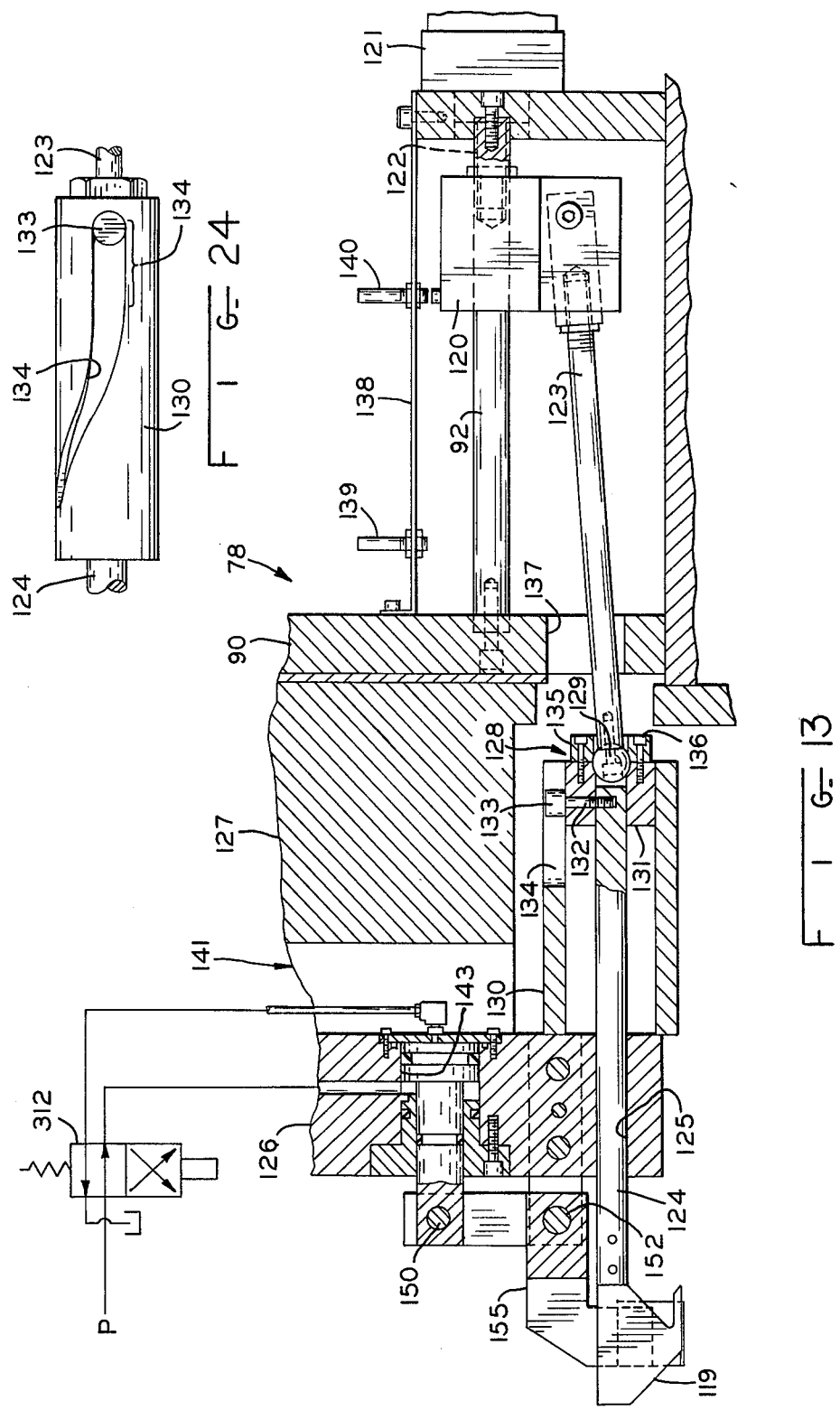

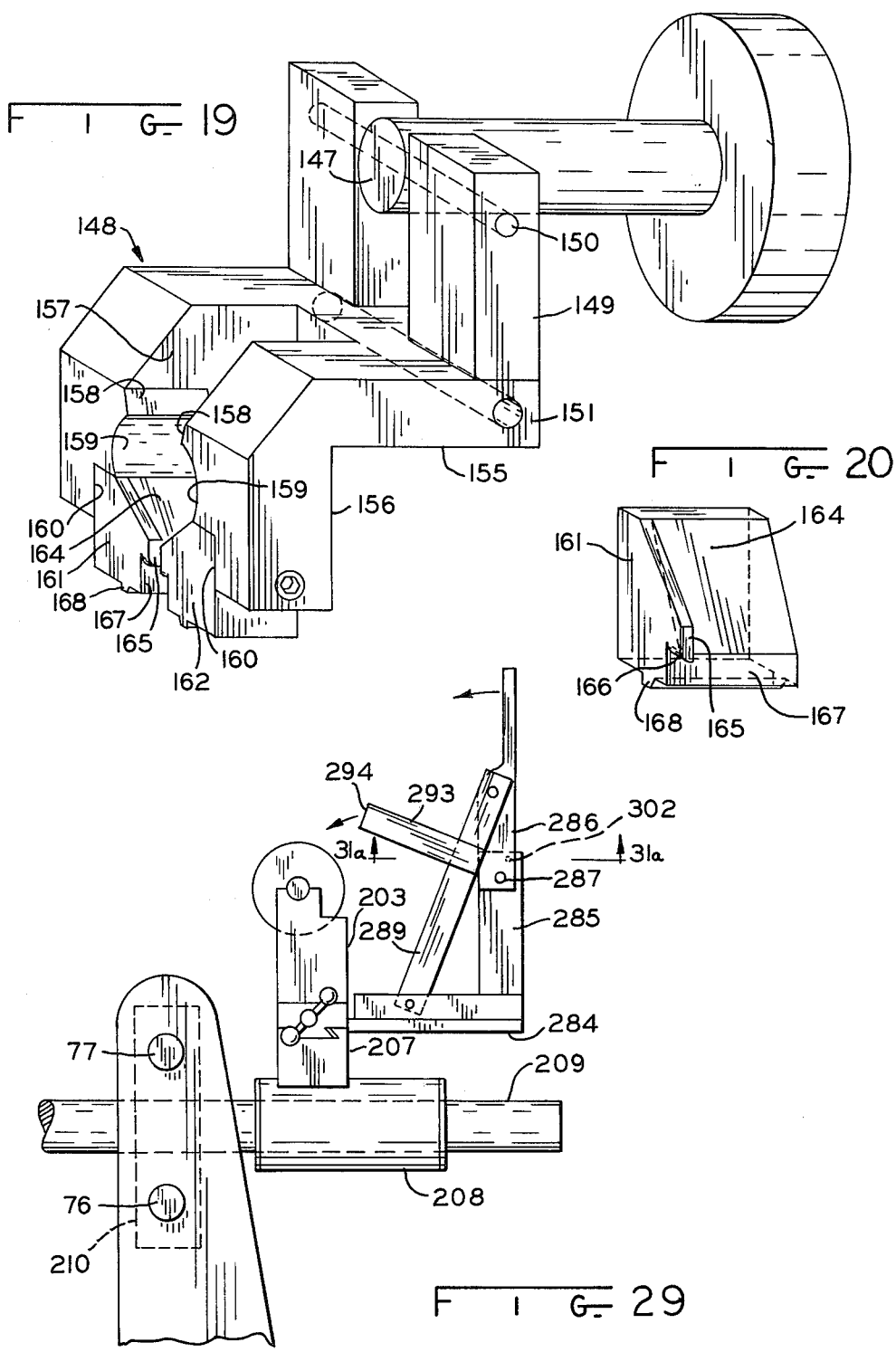

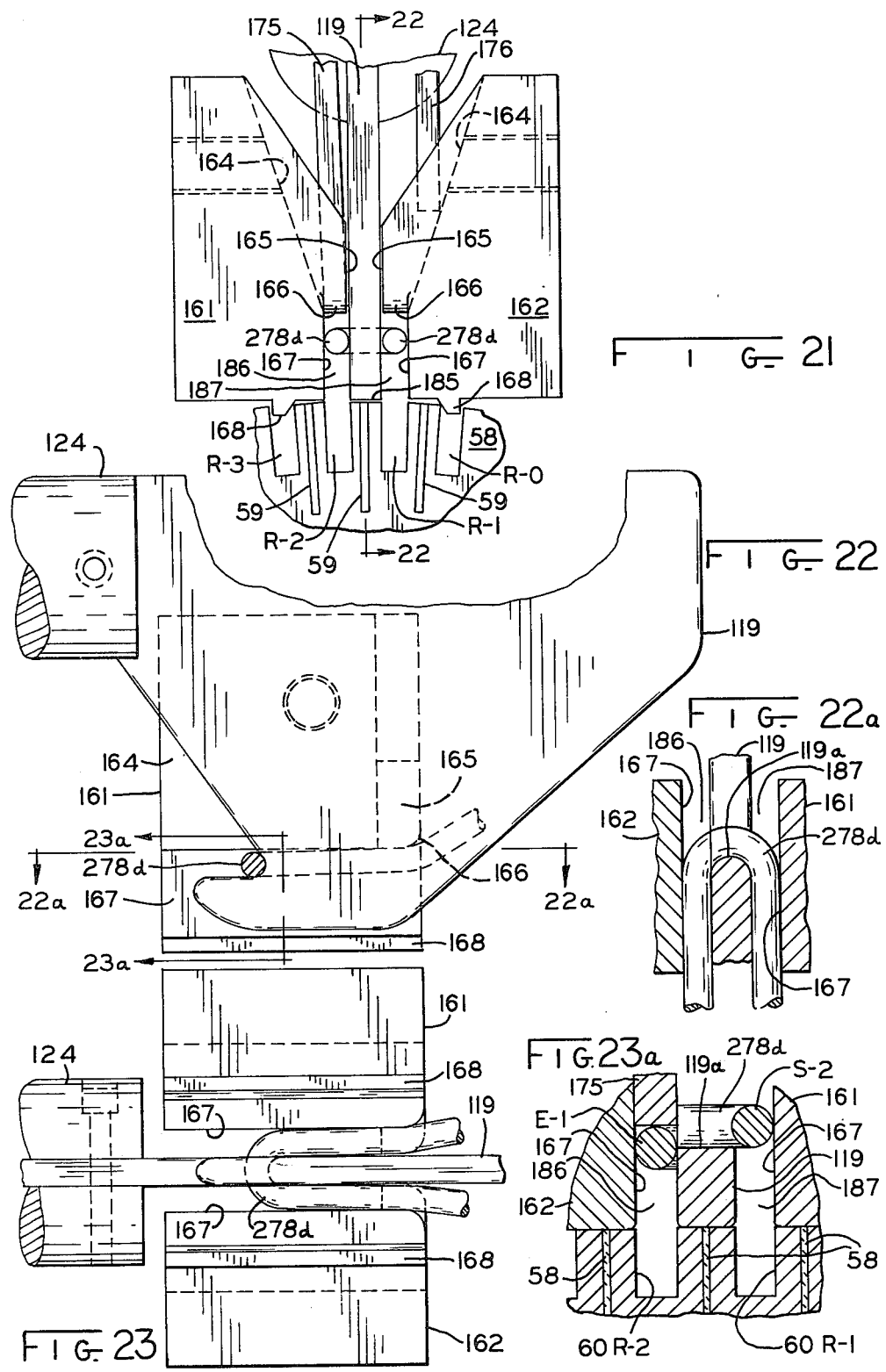

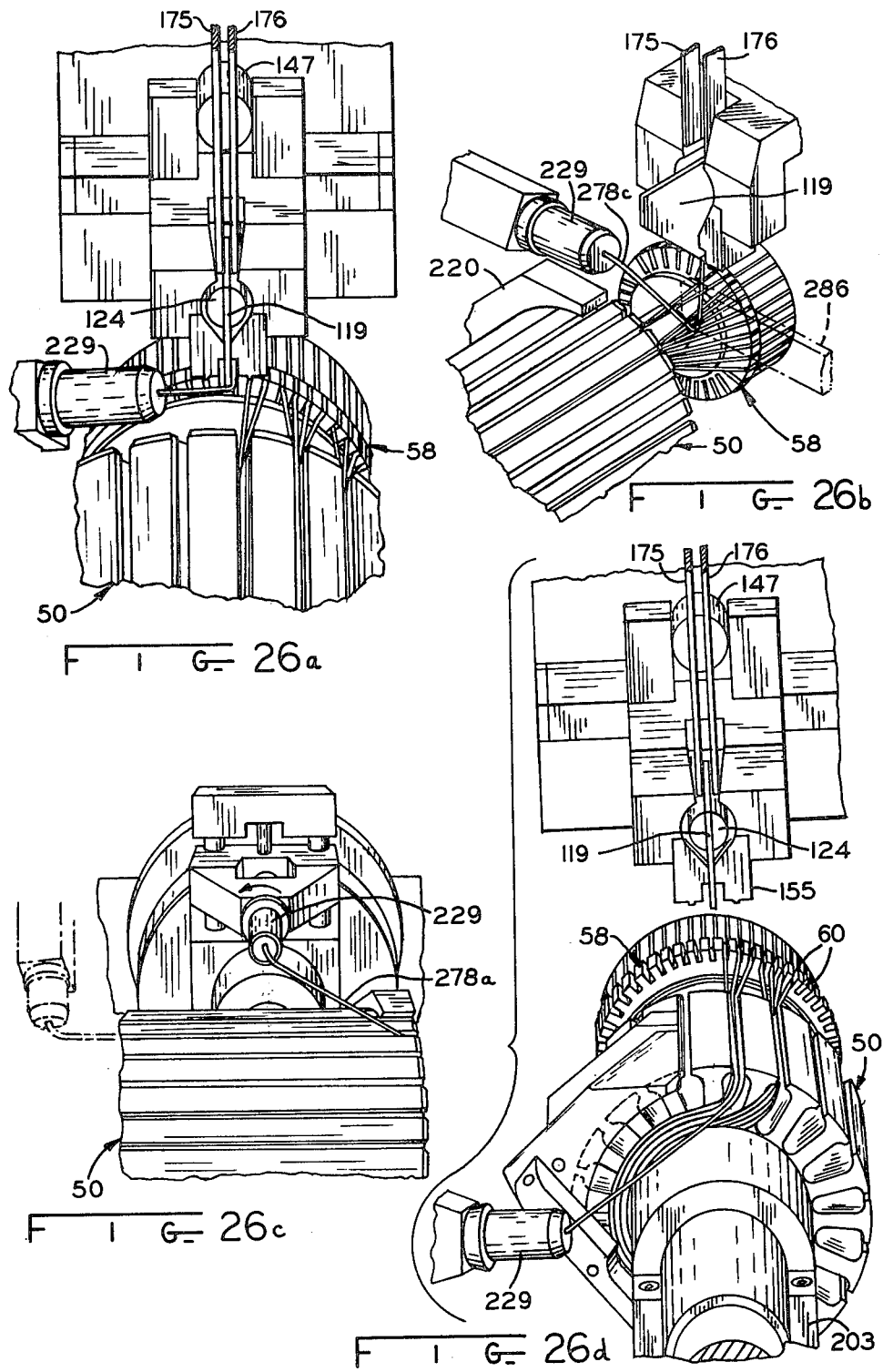

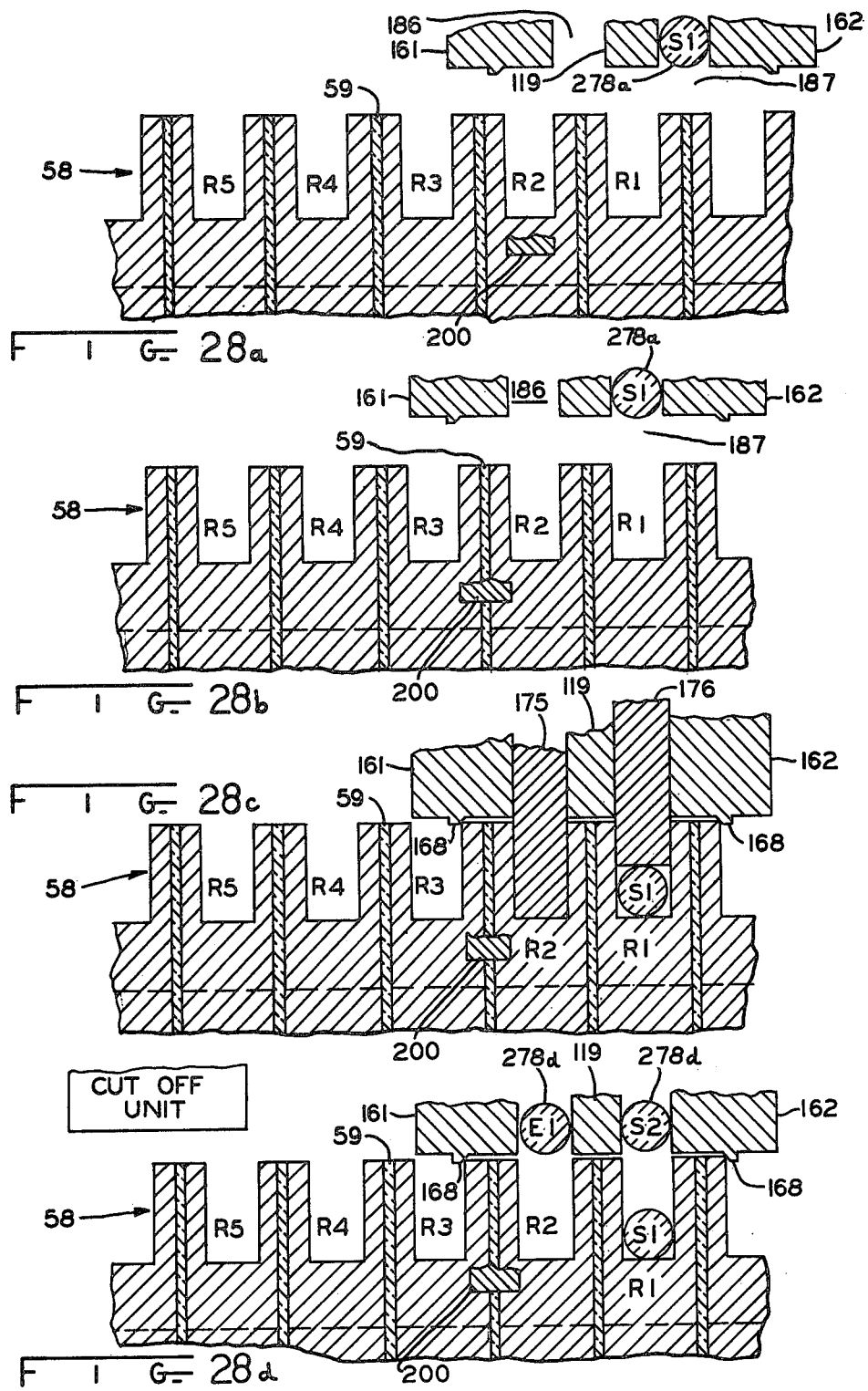

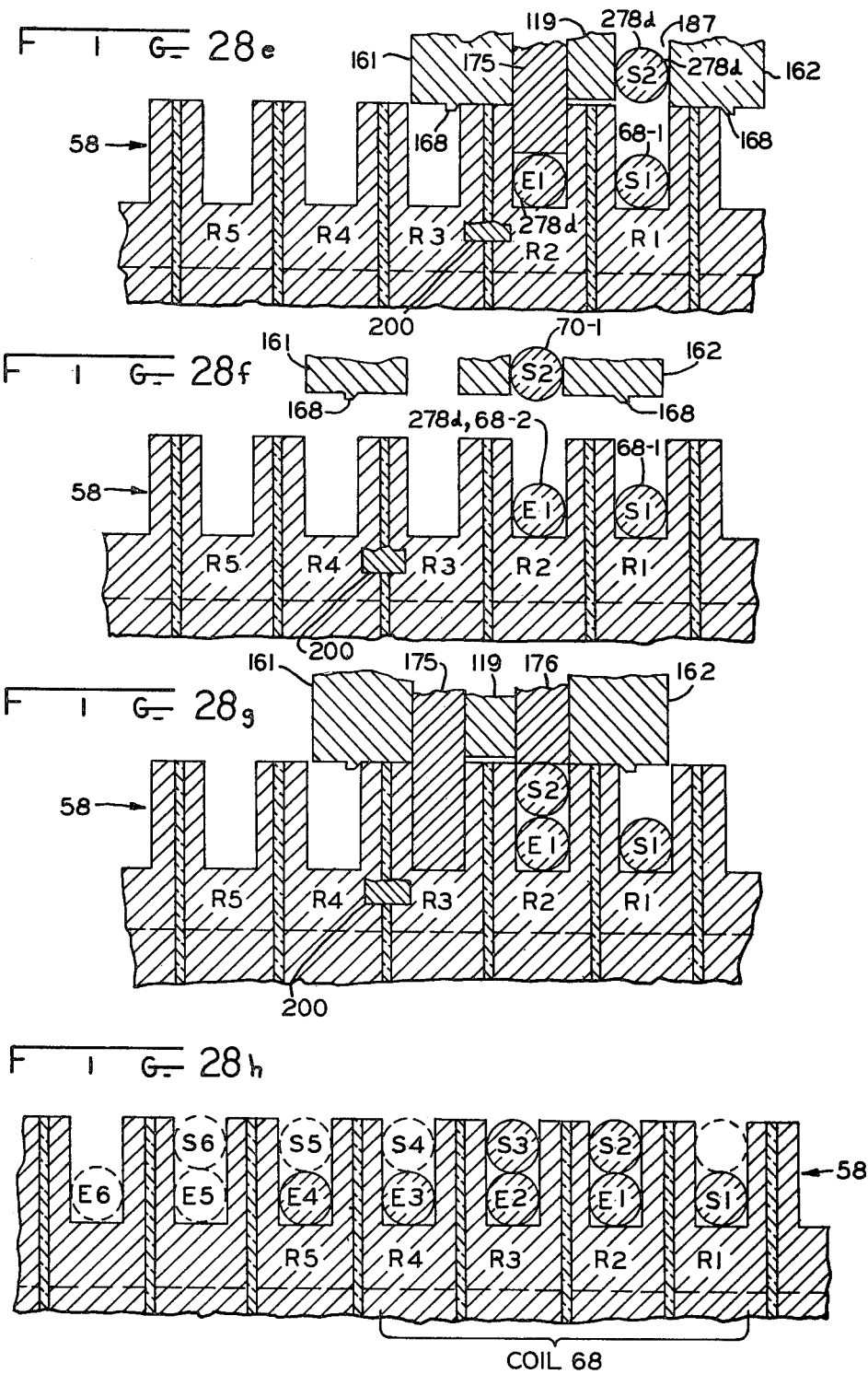

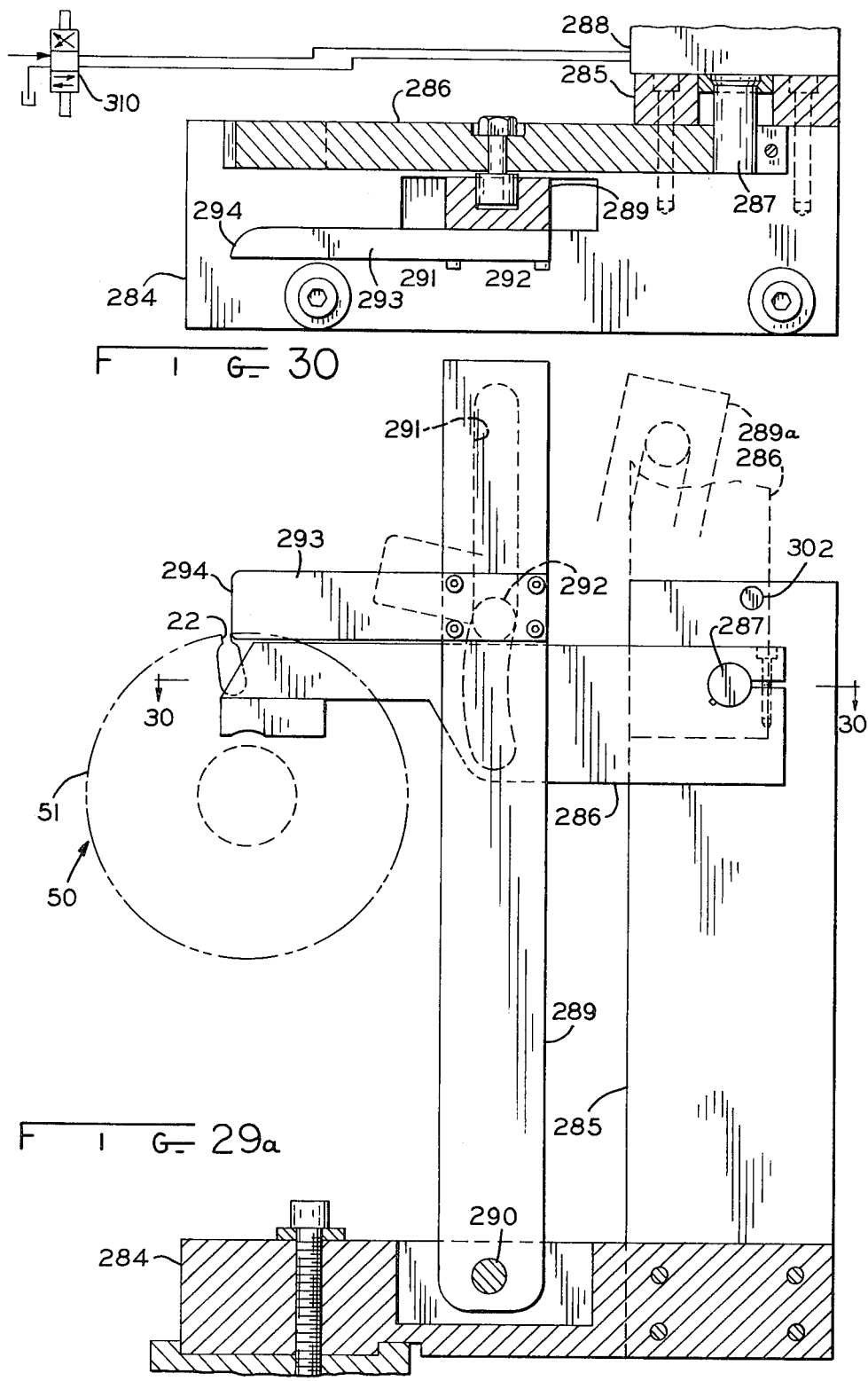

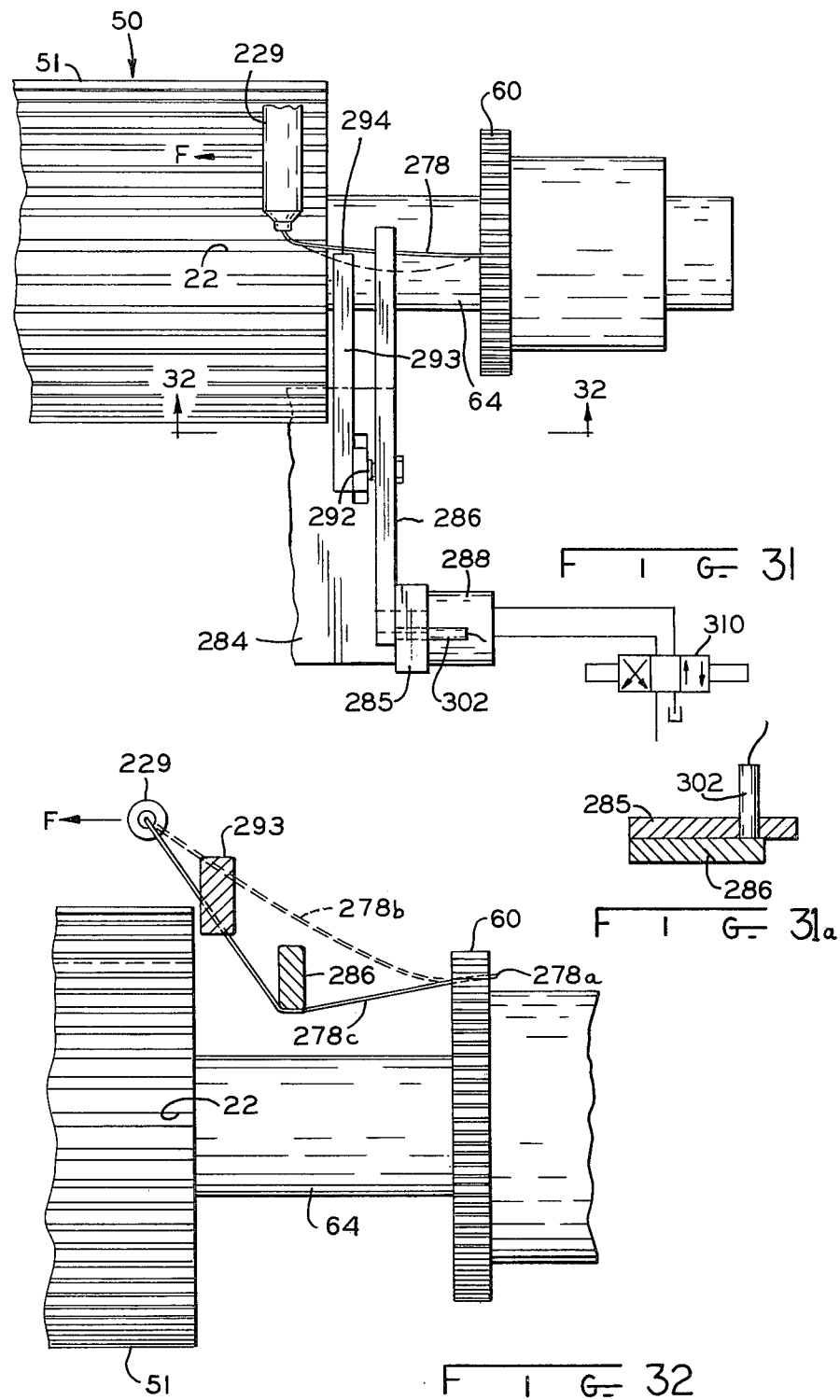

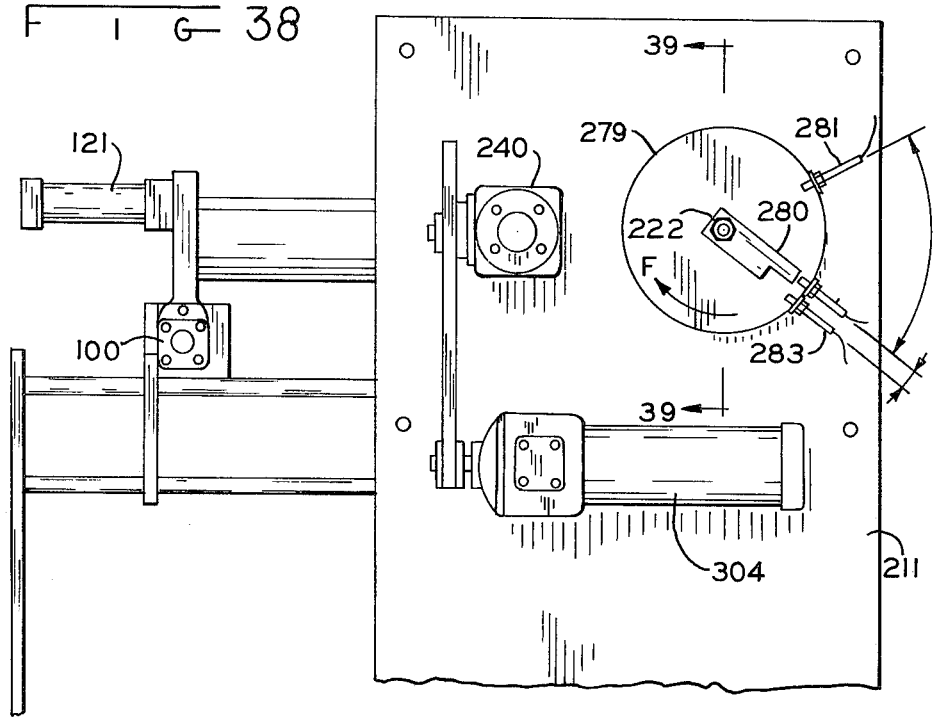
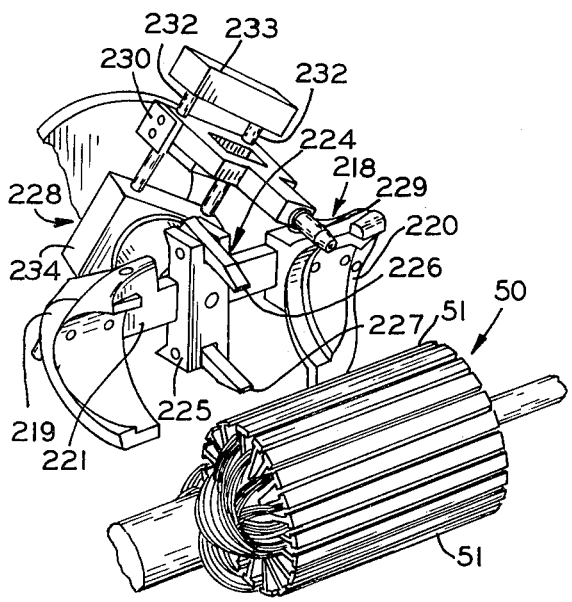
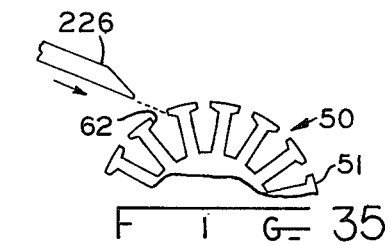
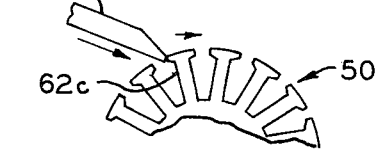

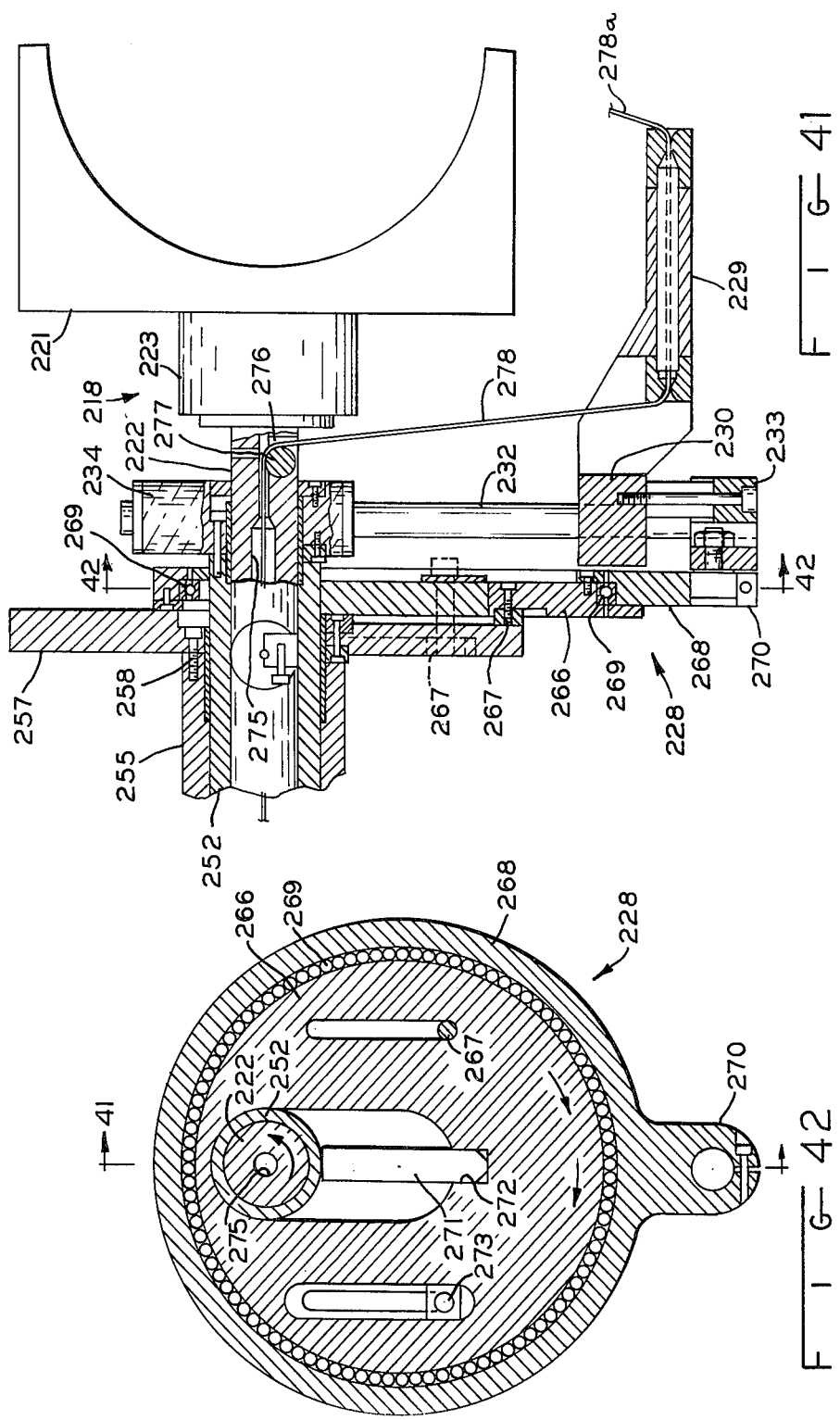

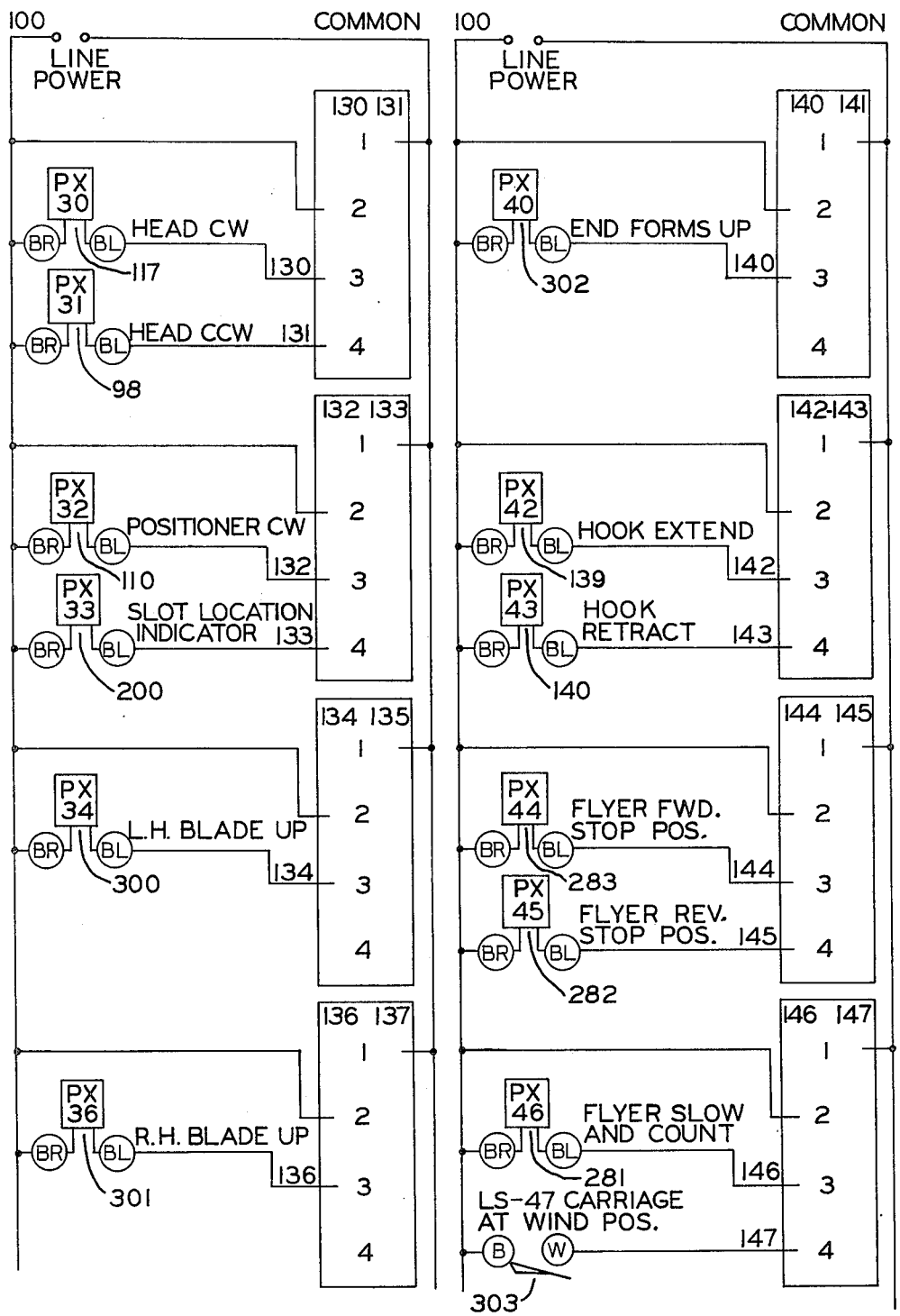

| Step | Action | Reference Number | Notes |
|---|---|---|---|
| STEP 1 | PRESS START SWITCHES | 208 b, 208 c | |
| STEP 2 | CARRIAGE 207 MOVES TO WIND POSITION | 303 | ARMATURE IS LOCKED IN WIND POSITION (FIG. 33 AT 207) |
| STEP 3 | HEAD (LEAD-CONNECTING MECHANISM 78) MOVES TO CW POSITION | 117 | FIGURE 28a |
| STEP 4 | POSITIONER SCREW 101 MOVES HEAD 78 CCW | 200 | RIGHT HAND GUIDE SLOT 187 OVER FIRST SLOT R-1 (FIGURE 28b) |
| STEP 5 | LEFT HAND BLADE 175 DOWN; START BLADE 175 "DOWN" TIMER; GRIPPER 155 DOWN; TIMER TIMES OUT | | FIGURE 28c |
| STEP 6 | RIGHT HAND BLADE 176 DOWN; START BLADE 176 DOWN TIMER; TIMER TIMES OUT | | |
| STEP 7 | END FORM 286, 294 DOWN; START END FORM TIMER; END FORM TIMER TIMES OUT | | FIGURES 31, 32 |
| STEP 8 | EYELET 229 STARTS WINDING FORWARD AT FAST SPEED 3/4 TURN | 281 | ARM 280 (FIG. 38) MOVES FROM SWITCHES 282 TO 281. COUNT #1 MADE ON TURN COUNTER IN CONTROLLER |

FIG. 52a

| Step | Description | Reference Number | Notes |
|---|---|---|---|
| STEP 9 | WINDING FORWARD CONTINUES UNTIL LAST COUNT PROXIMITY SWITCH MADE | 281 | FIRST SECTION THREE TURNS |
| STEP 10 | WINDING FORWARD IN SLOW SPEED CONTINUES UNTIL STOP PROXIMITY SWITCH MADE | 283 | FIGURE 38 |
| | LEFT HAND BLADE 175 UP | 300 | FIGURE 15 |
| | RIGHT HAND BLADE 176 UP | 301 | FIGURE 15 |
| | END FORM 286, 294 UP | 302 | FIGURE 29 |
| | GRIPPER 155 UP | | FIGURE 26 |
| STEP 11 | WIND SLOW REVERSE UNTIL REVERSE STOP PROXIMITY SWITCH MADE | 282 | |
| | HEAD 78 MOVES TO CCW POSITION | | 97 PROXIMAL TO SWITCH 98 FIG. 12 |
| STEP 12 | HOOK 119 MOVES TO OUT POSITION | | 119a, FIG. 14, FIG. 26f |
| STEP 13 | HEAD 78 MOVES TO CW POSITION | 117 | FIGS. 12b, 28d |
| STEP 14 | GRIPPER 155 MOVES TO DOWN POSITION | | |
| | HOOK 119 MOVES TO RETRACTED POSITION | 155 | FIGURE 28 |
| STEP 15 | LEFT HAND BLADE 175 TO DOWN POSITION | | FIGURE 28 |
| | START BLADE TIMER | | |
| | TIMER TIMES OUT | | |

FIG. 52b

| Step | Action | REFERENCE NUMBER | NOTES |
|---|---|---|---|
| STEP 16 | LEFT HAND BLADE 175 MOVES TO UP POSITION | | |
| | GRIPPER 155 MOVES TO UP | 300 | FIRST SECTION OF THREE TURNS IS COMPLETED. SECTION COUNTER COUNTS NO.1 |
| | POSITIONER SCREW 101 MOVES HEAD 78 CCW | 200 | SENSOR 200 PICKS UP NEXT SLOT 60 FIGURE 28 f |
| | STEPS NUMBERS 4 THRU 16 ARE REPEATED UNTIL ALL SECTIONS ARE WOUND IN FIRST COIL | | FIGURE 28 h |
| | NOTE AS THE LAST TURN OF THE LAST SECTION OF THE FIRST COIL IS COMPLETED | | |
| STEP 17 | HEAD 78 MOVES TO CCW POSITION | | FIGURE 8 |
| | POSITIONER SCREW 101 MOVES TO RETRACTED POSITION (NOTE HEAD 78 DOES NOT FOLLOW SCREW 101) | | |
| STEP 18 | CARRIAGE 207 MOVES OUT ONE INCH AND ACTIVATES PROXIMITY SWITCH 207b (FIG 33) | | FIRST COIL COMPLETED |
| REF. STEP 2 | | | NOTE: AS CARRIAGE 207 MOVES BACK TO WIND POSITION, ARMATURE IS INDEXED ONE CORE SLOT AND RELOCKED IN PLACE. (FIGS 34-37) |
| | NOTE: STEPS NUMBERS 2 THRU 18 ARE REPEATED UNTIL PREPROGRAMMED NUMBER OF COILS (ELEVEN FOR EXAMPLE) HAVE BEEN COMPLETED | | |

FIG-52c

APPARATUS FOR WINDING ARMATURES OF ELECTRIC MACHINES

BACKGROUND OF THE INVENTION

1. Field of the Invention

The present invention relates to machines for winding armatures of electric machines and more particularly to the winding of coils on the core of an armature having a commutator, and connecting the leads of the coil to the commutator.

2. Description of the Prior Art

An armature for an electric machine of the direct current type conventionally includes a slotted core and a commutator mounted on a common shaft. The commutator typically includes bars and a riser with slots for receiving the ends of the coil leads. In the prior art, the winding of the coils and the connection of the leads were, in one instance, performed by hand. The connection and trimming of coil leads in another instance were performed by means of a machine as disclosed in U.S. Pat. No. 3,156,037.

SUMMARY OF THE INVENTION

This invention relates to an apparatus for winding the armature of an electric machine, wherein the armature is provided with a slotted core and a commutator mounted on a common shaft. The commutator is provided with bars and risers with slots in the risers to which coil leads are connected. This apparatus includes a supporting frame and means on the frame for supporting an armature in winding position. Lead-connecting mechanism is carried by the frame adjacent to the supporting means in juxtaposition to the commutator of the armature for locating two coil leads in two riser slots, respectively. Means mount the lead-connecting mechanism for limited relative rotation about the axis of the armature, and coil-winding mechanism is carried by the frame for winding a coil on the core of the armature.

The lead-connecting mechanism includes a coil lead guide device having two lead-aligning sections laterally spaced a distance corresponding to the spacing between two adjacent slots in the commutator riser. The lead-aligning sections are disposed radially opposite the riser with the sections thereof being in alignment with two adjacent riser slots. Means are provided for locating the two end leads of a coil wound on the core in the lead-aligning sections in radial alignment with the two riser slots, respectively. Two lead-inserting devices are provided for selective movement into and out of the riser slots for inserting the coil leads into the slots, respectively, and for trimming the coil leads as they are inserted into the riser slots.

It is accordingly an object of this invention to provide an improved apparatus for winding an armature of an electric machine and for connecting the coil leads to the commutator thereof.

The above-mentioned and other features and objects of this invention and the manner of attaining them will become more apparent and the invention itself will be best understood by reference to the following description of an embodiment of the invention taken in conjunction with the accompanying drawings.

In the drawings FIG. 1 is perspective view of a typical armature which is wound by the machine of the present invention;

FIG. 2 is a fragmentary longitudinal sectional view of a portion of the core and commutator or the armature of FIG. 1;

FIG. 3 is an end view of the armature showing the core and slots therein;

FIG. 4 is a cross section taken substantially along section line 4—4 of FIG. 2;

FIG. 5 is a diagrammatic illustration of a coil configuration and connections to the commutator;

FIGS. 5a, 5b and 5c are front, end and perspective views, respectively, of a typical coil wound by the machine of this invention;

FIG. 7 is a fragmentary front view of the machine;

FIG. 8 is a fragmentary end view;

FIG. 9 is an end view like that of FIG. 8 of primarily the frame plate only;

FIG. 10 is a fragmentary front view of that portion of the frame which supports the lead-connecting mechanism of the machine;

FIG. 11 is a fragmentary top view of the right-hand end portion of the machine showing in particular the support for the lead-connecting mechanism;

FIG. 12a is similar to FIG. 12 but showing the components in greater structural detail;

FIG. 12b is a fragmentary, longitudinal sectional view of the rotary motor device of the preceeding FIGS. 12 and 12a;

FIG. 13 is a fragmentary longitudinal section of the lead-connecting mechanism showing in particular the details of the hook element and gripper block;

FIG. 19 is another perspective of the gripper as shown in FIG. 18;

FIG. 20 is a perspective of one of the gripper blocks as shown in FIG. 19;

FIG. 21 is an enlarged, fragmentary view of the gripper and hook combination as shown in FIG. 17;

FIG. 22 is a section taken along section line 22—22 of FIG. 21 and FIG. 22a is a section on line 22a of FIG. 22;

FIG. 23 is a bottom view of the gripper and hook combination shown in the preceeding FIGS. 21 and 22 and FIG. 23a is a section along line 23a of FIG. 22;

FIG. 24 is a side view of the cam device which is operatively connected to the hook of the preceeding FIGS. 17 and 21;

FIGS. 26a through 26g are fragmentary views showing various stages of the machine operation and winding armature;

FIGS. 28a through 28h are diagrammatic illustrations of the steps of inserting leads in the riser slots;

FIG. 29 is a side view of the coil lead former in its upright position out of operative engagement with the armature;

FIG. 29a is an enlarged fragmentary view of the former partly sectioned for clarity and showing the former in different positions;

FIG. 30 is a cross section taken substantially along section line 30—30 of FIG. 29a;

FIG. 31 is a top plan view of the former in operative position over an armature being wound;

FIG. 32 is a fragmentary sectional view taken substantially along section line 32—32 of FIG. 31;

FIG. 34 is a perspective of the winding head assembly and an armature in the process of being unloaded after having been wound;

FIGS. 35, 36 and 37 are fragmentary end views of an armature in the process of being moved into winding position and incrementally rotated as it is being moved into this position;

FIG. 38 is a rear view of the machine;

FIG. 41 is a fragmentary sectional view also taken along section line 39—39 of FIG. 38 but showing in more detail the winding head assembly;

FIG. 42 is a cross section taken substantially along section line 42—42 of FIG. 41;

Figures 46, 49:
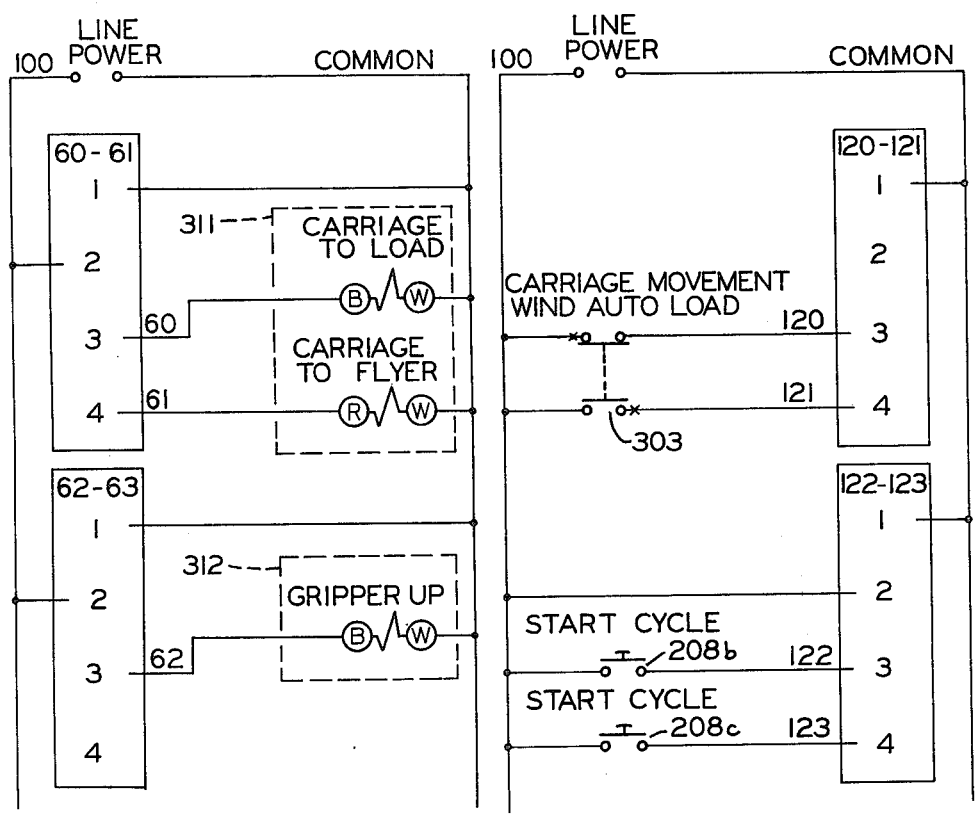
Figures 47, 48:
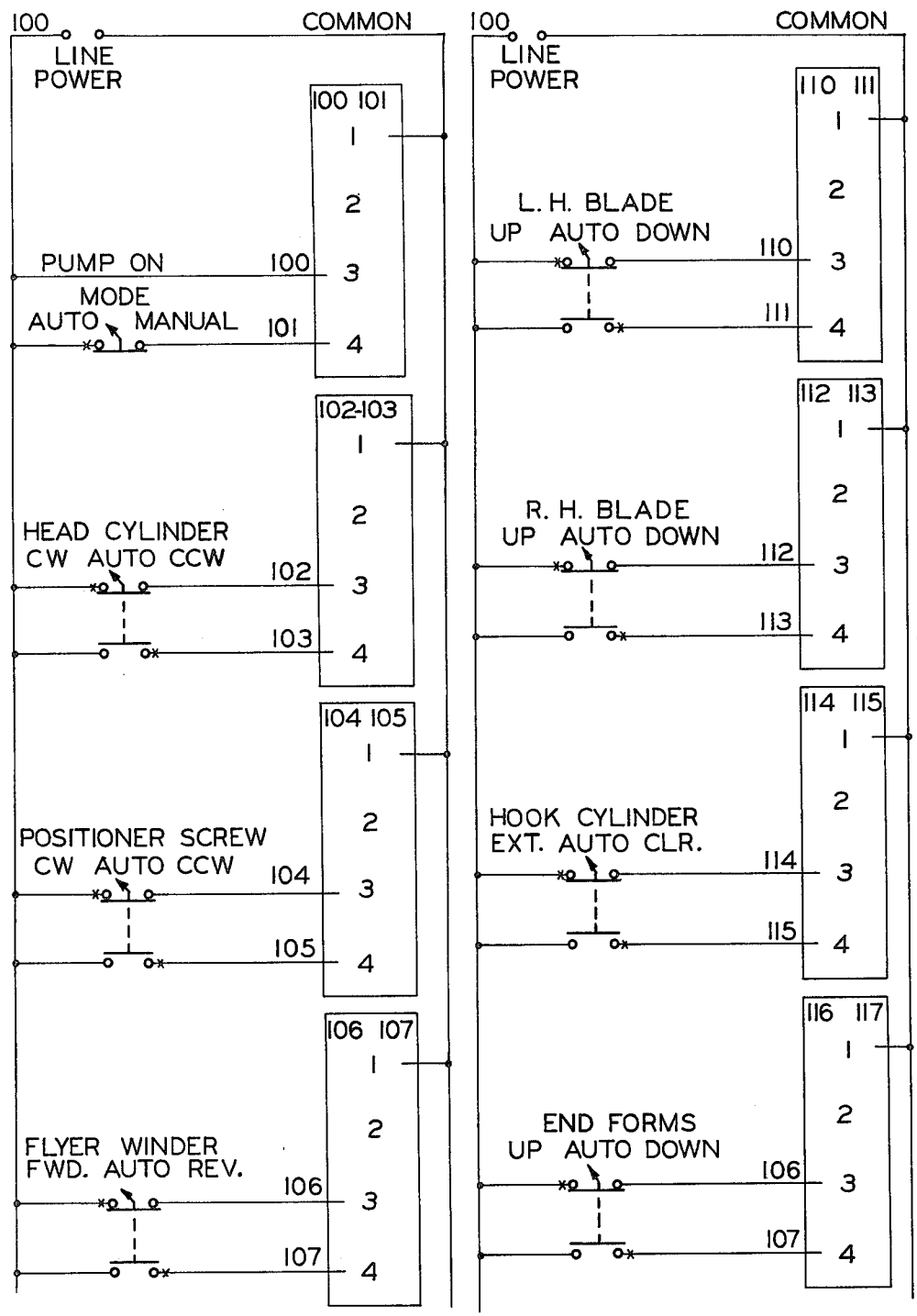
Figure 52D:
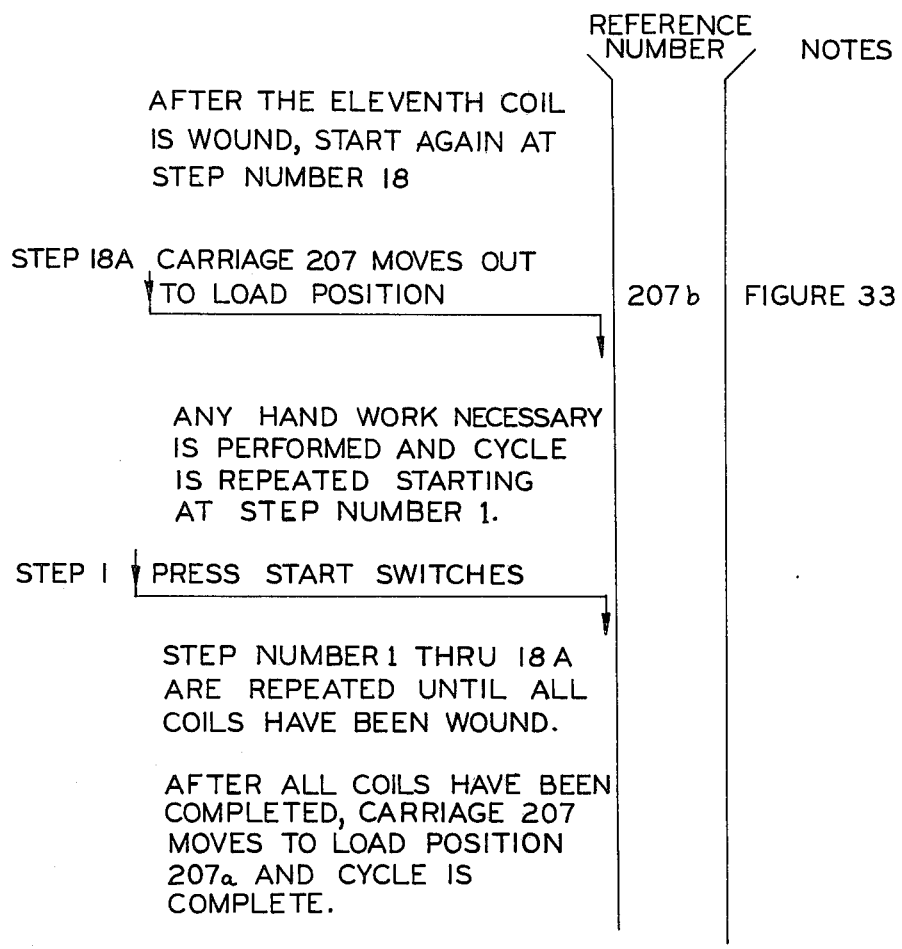

FIGS. 44 to 51 are schematic diagrams of the control system, FIGS. 47, 48 and 49 showing switches which may be manually controlled and FIGS. 50 and 51 showing the automatic system; and FIGS. 52a through 52d depict in chart form the operational sequence of the machine.

A typical armature for an electric machine such as a direct current motor or generator is shown in FIG. 1, which includes a core 50 having a plurality of circumferentially spaced slots and a commutator 52 mounted on a common shaft 54. The commutator 52 (see also FIG. 4) includes a plurality of commutator bars 56 and a riser 58 of larger diameter. The riser 58 is provided with a plurality of circumferentially spaced slots 60, one slot 60 for each bar 56, which receive, respectively, the ends of the coils wound in pairs of slots 62 in the core 50. Conventionally, these ends are manually inserted into the riser slots 60 and conductively secured in place. One end of the coil is indicated by the numeral 64 in FIG. 2 which has been fitted into a riser slot indicated by the numeral 60a.

The commutator 52 further includes insulating strips 59 (FIGS. 2 and 4) of mica or the like sandwiched between bars 56. Viewing the peripheral surface, the cylindrical commutator 52 being composed primarily of copper, presents a correspondingly colored surface interrupted by the axially extending mica strips 59 of distinctly different color. This difference in color is utilized, as later explained in indexing the lead-connecting mechanism of the winding machine, a photo-sensitive slot finder or sensor providing an electrical signal which distinguishes the bars 56 from the slots therebetween as occupied by the mica strips 59. Since the riser slots 60 are centered in the respective bars 56, locating the strips 59 can serve as a means of indexing slots 60 to desired positions as explained later.

This invention relates to the winding of coils in respective slot pairs 62a, 62b in the core 50 and automatically connecting the ends 64 of these coils in the proper slots 60 in the riser 58. For purposes of explaining a typical coil arrangement, and referring to FIG. 1, a pair of circumferentially spaced slots 62a and 62b are selected. These are also shown diagrammatically in FIG. 5. Each coil consists of a plurality of turns wound through the slots 62a and 62b having a coil span 66 between these slots. A typical coil is indicated by the numeral 68 in FIG. 5 and consists of three winding sections 68a, 70 and 72. Each winding section includes a predetermined number of turns in the slot pair 62a, 62b, the section 68a having one of its ends 68-1 in the adjacent riser slot R-1 (60) (and the opposite end 68-2 in slots R-2 (60). Similarly, the winding section 70 has its starting end 70-1 connected into riser slot R-2 and its terminating end 70-2 connected into riser slot R-3. Lastly, the third section 72 has its starting end 72-1 connected into the slot R-3 and its terminating end 72-2 connected into riser R-4. This completes the description of the coil 68 and its connections to the respective bars 56 of commutator 52. The starting end 74 of the coil in the next pair of core slots 62 is connected into the riser slot R-4 with the remaining ends of the winding sections being connected into the successive riser slots in a pattern repeating that just explained. Other coils composed of winding sections are wound in adjacent pairs of core slots with the section ends being connected to the riser slots and associated commutator bars in the same ascending sequence circumferentially of the riser 58 with the section starting and terminating ends being connected to the successive riser slots in the same manner as described. Coils and connections are added about the core and riser until all of the slot pairs in the core have received coils and the ends thereof have been connected to the appropriate riser slots of the commutator 52. The resultant wound armature is in this respect conventional and needs no further elaboration.

While the commutator slots 60 are specifically illustrated as being formed in riser 58 of larger diameter than the commutator itself, it is to be understood that such slots 60 may be formed in the ends of commutator bars forming a commutator of uniform diameter from end-to-end. Thus the term "riser" is intended to include any commutator portion of any size which includes slots 60, and the claims appended hereto are to be so construed.

COIL LEAD-CONNECTING MECHANISM POSITIONING ASSEMBLY

Referring now to the drawings, and more particularly to FIGS. 6 through 12, 12a, 12b and 33, the machine includes a stationary supporting frame generally indicated by the numeral 73, having spaced uprights 74 adapted to be mounted on a floor. Extending between the uprights 74 are rigid, horizontal frame members 75, 76 and 77 which are spaced apart and parallel, members 76 and 77 serving to mount slidably various of the adjustable machine elements.

Carried by the frame 73 is a lead-connecting mechanism indicated generally by the numeral 78. This mechanism 78 is mounted for limited rotation on the frame 73, this being illustrated in more detail in FIGS. 6 through 12. This rotatable mounting includes two upright plates 80 and 81 which are spaced apart and parallel and two guide bearings 82 and 83 which are also spaced and parallel and secured at the ends to the two plates 80 and 81. The two guide bearings 82 and 83 are slidably mounted on the two frame bars 76 and 77, respectively, and a screw crank adjustment 84 is connected between the frame plate 74 and the adjacent frame plate 80 for horizontally adjusting and locking the frame 80,81 relative to the main frame 73.

Further mounted between the two plates 80, 81 is a stationary shaft 85 secured at the ends to the two plates 80, 81 by means of suitable threaded fasteners 86. An elongated cavity 87 in the shaft 85 opens through one side thereof and registers with the corresponding cutouts 88 in the end plates 80,81.

Figure 12:
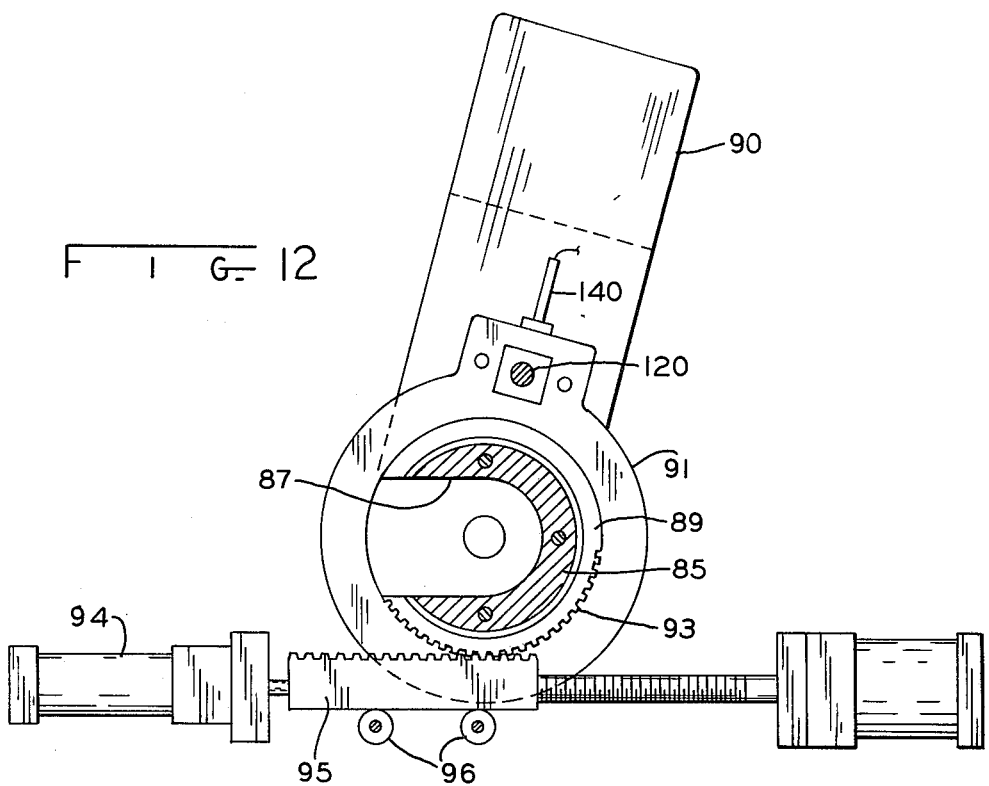
FIG. 12 is a cross section taken substantially along section line 12—12 of FIG. 11 showing certain of the components in diagramatic form.

Rotatably mounted on the stationary shaft 85 is a sleeve bearing 89 which is C-shaped in cross section as shown more clearly in FIG. 12, the opening in this bearing 89 registering with the cavity 87 and cutouts 88, previously described. Secured to the bearing 89 near the opposite ends thereof and in parallelism are two framework plates 90 and 91 having two guide bars (FIG. 11) fixedly secured thereto and extending therebetween, the guide bars 92 extending substantially parallel to the axis of the stationary shaft 85.

Figure 6:
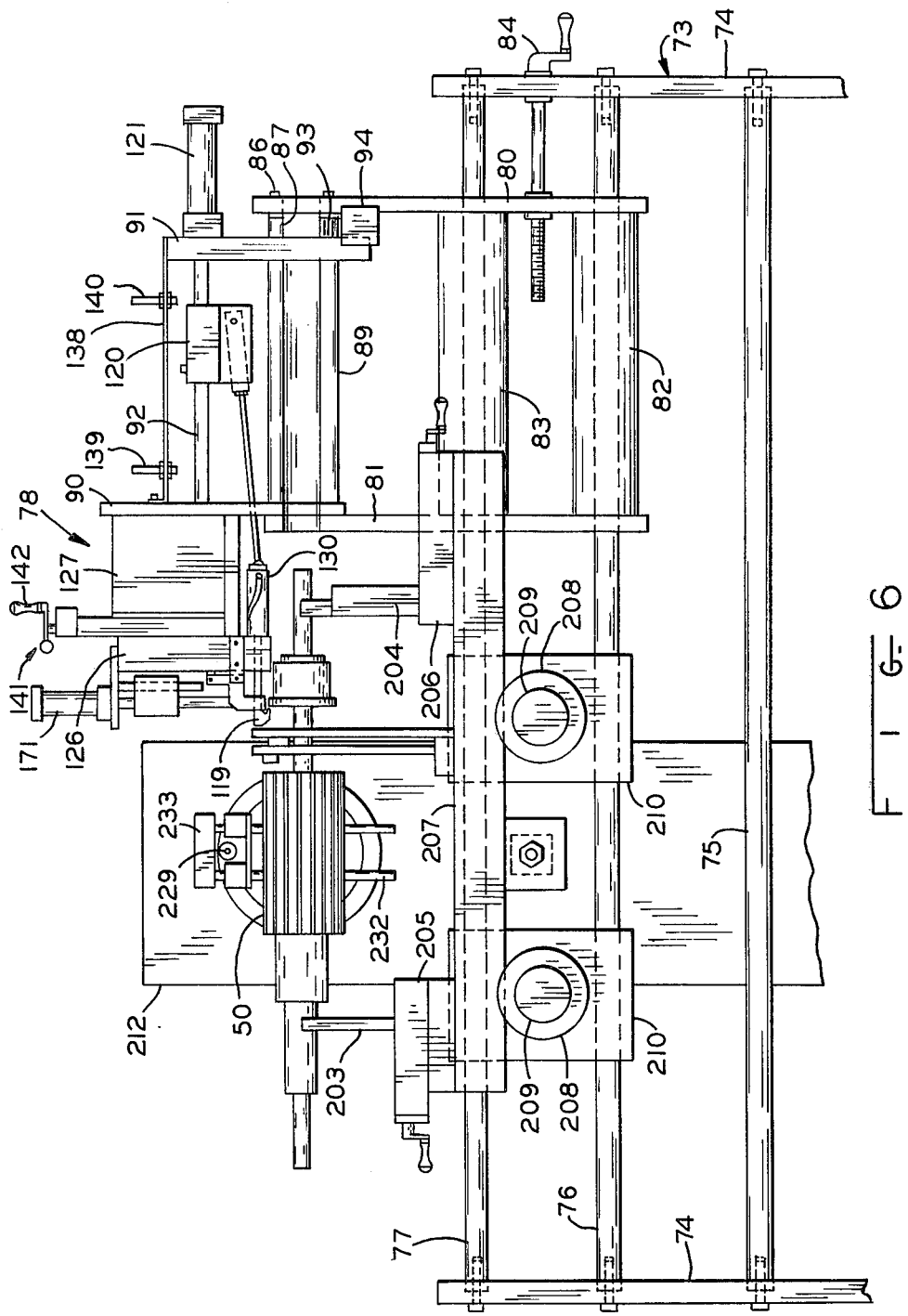
FIG. 6 is a front view of the machine of this invention with an armature in position for having a coil wound thereon.

On the right hand end of the sleeve bearing 89, as viewed in FIGS. 6, 7 and 11, is secured a gear segment 93, this segment 93 being disposed immediately adjacent to the frame plate 80. A double acting hydraulic head cylinder 94 is secured to the plate 80 (FIGS. 6, 8, 11, 12 12a) and has a reciprocable gear rack 95 connected to the piston rod thereof. The rack 95 is supported for longitudinal, reciprocating movement by means of spaced rollers 96 on frame plate 80, rack 95 otherwise being supported for engagement with the gear segment 93. Reciprocation of the head cylinder 94 thus results in swinging the sleeve bearing 89 and the two plates 90 and 91 connected thereto correspondingly.

Further with regard to the head cylinder 94, a sensing plate 97 (FIGS. 8 and 12a) is secured to the rack 95 to depend therefrom in registry with a conventional proximity switch 98 suitably secured to the frame plate 80 and cylinder 94. The proximity switch 98 senses the leftward movement of the rack 94 as viewed in FIGS. 8 and 12a such that when the plate 97 is immediately adjacent to the switch 98 the latter generates an electrical signal which is coupled to a three position solenoid valve 305 (FIG. 120) which deactuates and stops the cylinder 94. This results in precisely positioning the rack 95 in its preadjusted, leftward position as shown in FIGS. 8 and 12a.

Further positioning of the rotated postition of the sleeve bearing 89 and its two plates 90, 91 is provided by the hydraulic positioner mechanism indicated generally by the numeral 99, this mechanism 99 being shown in more detail in FIGS. 8, 11, 12a and 12b. Generally, this mechanism 99 includes a rotary, hydraulic, positioner motor 100 and a positioner, screw shaft 101 having a rotary drive connection therewith. A plate element 102 which serves as a part of the stationary frame of the mechanism 99 is secured to the edge of the frame plate 80 by means of threaded fasteners (not shown). To the plate 102 (FIGS. 12a and 12b) is secured a nut element 103 which threadedly receives the positioner screw 101, the nut element 103 thereby being fixed with respect to the frame element 80. Rotation of the positioner screw 101 by means of the rotary positioner motor 100 causes longitudinal movement of the screw 101.

To accommodate the relative longitudinal movement with respect to the screw 101 and the motor 100, a lost motion drive 104 is provided. This drive includes a longitudinally slotted sleeve shaft 105 keyed to the output shaft 106 of the motor 100 but loosely telescoped over the end of the screw 101. A collar 107 fits over the sleeve shaft 105, and a diametrical drive pin 108 is received by companion holes therein and the sleeve slot 109 so as to be rotatable with sleeve 105. The right hand end of the screw 101 has a transverse hole which receives the pin 108 thereby rotatably connecting screw 101 to sleeve 105. The motor 100 is reversible, a suitable, conventional, electrically actuable solenoid valve 306 like valve 305, being provided for this purpose.

The position of the screw 101 is sensed and controlled by means of a proximity switch assembly consisting of a proximity switch 110 carried by a block 11 adjustably slidably mounted on a guide rod 112 which extends between the two frame elements 102 and 113 of the positioning mechanism 99. A spacer block 114 is mounted on the guide rod 112 in abutting relation with the frame element 113 such that when the sensor block 111 is engaged therewith, the proximity switch 110 is precisely located. The proximity switch 110 is so positioned that as the collar 107 moves on the sleeve shaft 105 into proximity with the end of the switch 110, the latter is caused to generate an electrical signal which acuates solenoid valve 306 (FIG. 12a) deactuating the hydraulic motor 100. Recapitulating, by reason of the pin 108 connecting the screw 101 to the collar 107 and the axial slots 109 in sleeve shaft 105 accomodating movement of pin 108 in slot 109, rotation of the shaft 105 causes axial movement of the screw 101 in the nut element 103. Considering the positions of the various parts as shown in FIG. 12b, if the motor 100 is actuated so as to rotate the shaft 101 to cause rightward movement of the collar 107 on the shaft 105, as soon as the collar 107 comes into registry with the proximity switch 110, the latter generates a signal which serves in stopping the motor 100. The screw 101 thus is adjusted axially.

As shown in FIGS. 8, 11, 12, 12a and 12b, the rack 95 and positioning screw 101 are disposed in longitudinal alignment with the ends thereof being abuttable. In order to accomodate rotation of the screw 101 relative to the end of rack 95, a ball element 115 is carried in the end of rack 95.

A position-sensing collar 116 is adjustably secured to the positioner screw 101 as shown (FIGS. 12a and 12b). A proximity switch 117 is mounted on a bracket 118 secured as shown to the rack 95. As the collar 116 comes into registry with the switch 117, the latter generates a signal, for one operational step of the machine, used to deactuate both the hydraulic cylinder 94 and the rotary motor 100 by operating the respective valves 305 and 306 and to hold rack 94 in position.

With respect to the operation of the cylinder 94 and motor 100, it may be generalized that the motor 100 serves in determining different rotated positions of the gear segment 93, the associated sleeve bearing 89 and plates 90 and 91, with the rack 95 actually producing the rotation of the gear segment 93. For the initial set up, the machine control circuits (FIGS. 44-51) are so arranged that for the machine "start" position, the hydraulic cylinder 94 has been actuated causing the rack 95 to retract to the position shown in FIGS. 8 and 12a (the proximity switch 98 determining this retracted position), and the hydraulic motor 100 has been operated to move the screw 101 rightward (as viewed in FIGS. 8 and 12b) until the motor 100 has been deactuated by reason of collar 107 moving into registry with the proximity switch 110. In these positions of the rack 95 and screw 101, the adjacent ends, of course, are separated.

For the next step of machine operation which will be elaborated further hereinafter, the head cylinder 94 is actuated causing the rack 95 to be moved toward the right as viewed in FIGS. 8, 12a and 12b until the rack engages the end of the screw 101. In this instance, the screw 101 serves as a stop for the rack 95 thus locating the longitudinal position of the rack 95. The gear segment 93 is thus correspondingly adjusted rotatably.

It should be noted that the engagement of the rack 95 with the end of the screw 101 is sensed by means of the proximity switch 117 which generates a signal used in actuating the positioner motor 100. Generally speaking, this now leads to the second operational step of the machine. Since outward rotation of the positioner screw 101 in the nut element 103 exerts a greater force leftward on the rack 95 than does the hydraulic pressure within head cylinder 94, the rack 95 will now be forced leftward as viewed in FIGS. 8, 12a and 12b against the pressure causing corresponding indexing movement of the gear segment 93. By reason of another sensor located elsewhere in the machine and to be described later, a predetermined increment of reversed rotation of the gear segment 93 is sensed resulting in the generation of a control signal which deactuates positioner motor 100. This results in the rack 95 being positively held in adjusted position which in turn holds the gear segment 93 and its associated parts stationary in adjusted or indexed position.

COIL LEAD-CONNECTING MECHANISM AND LOCATING ASSEMBLY

Referring to FIGS. 6, 7, 11 and 13, the coil lead pulling and locating assembly generally includes a hook element 119 which is reciprocable and rotatable which serves as a part of the lead-connecting mechanism 78. Noting more particularly FIGS. 7, 11 and 13, a connecting block 120 is mounted on the guide rods 92 for reciprocating movement. A double acting hydraulic cylinder 121 is mounted on frame element 91 and has its piston rod 122 (FIG. 13) connected to the connecting block 120 for reciprocating the latter. A connecting rod 123 is pivotally connected at its right hand end to the connecting block 120 and at its left hand to hook-operating rod 124. This rod 124 is slidably received by a guide bore 125 in head block 126 which is secured to frame element 90 by means of spacer blocks 127, suitable threaded fasteners (not shown) being used to secure the blocks 126 and 127 together and also to the frame element 90. The rod 124 carries the hook element 119 on its left end and on its right end has a socket assembly generally indicated by the numeral 128 for connection to a ball element 129 on the left end of the connecting rod 123. This socket assembly 128 is reciprocably received by a cam sleeve 130 secured to the head block 126 in coaxial alignment with the rod bore 125 and includes a collar 131 secured to the rod 124. Collar 131 is secured to the rod 124 by means of a threaded fastener 132 having a round head 133, and received by a cam slot 134 in the sleeve 130. The particular configuration of this cam slot 134 is further shown in FIG. 6 and more particularly in FIG. 24.

The collar 131 is recessed to receive the ball 129 as shown and has a retaining ring 135 which surrounds the ball 129 secured thereto by means of threaded fasteners 136. Thus, the retaining ring 135 and collar 131 provide a socket for the ball 129 which permits rotation of the hook-operating rod 124 during reciprocation thereof. Leftward movement of the connecting rod 123 imparted to the rod 124 results in sliding movement of the collar 131 within the sleeve 130 and corresponding sliding movement of the screwhead 133 in the cam slot 134. Thus, the rod 124 is not only moved leftward but is also rotated. The cam slot 134 provides 90° rotation for a full stroke of the hook cylinder 121 for a reason to be explained more fully hereinafter.

In order to accommodate the reciprocatory movement of the connecting rod 123 a relatively large opening 137 is provided in the frame element 90 (FIG. 13).

An elongated switch-supporting element 138 (FIGS. 6, 7 and 11) is secured at its ends to the two frame elements 90 and 91 in parallelism with the guide rods 92. Two spaced proximity switches 139 and 140 are mounted on the element 138 as shown in proximity to the connecting block 120. Both switches 139 and 140 generate electrical signals in response to movement of one edge of the connecting block 120 into registry therewith. The switch 140 is used for limiting the extent of rightward movement of the connecting block 120 and the switch 139 for leftward movement. Assuming that the extreme rightward position is as shown in FIGS. 6, 7 and 11, actuation of the hook cylinder 121 moves the connecting block 120 toward the left until it comes into registry with the proximity switch 139. The signal thus generated by the switch 139 is utilized to trigger a solenoid valve 309 (FIG. 7) like valve 305 which deactuates hook cylinder 121 thereby stopping movement of the connecting block 120. Upon actuation of the hook cylinder 121 in reverse, this hook cylinder being double acting, the connecting block 120 upon moving rightward will come into registry with switch 140 which in turn generates a signal triggering valve 309 deactuating hood cylinder 121. This operation will be further elaborated later on.

COIL LEAD-CONNECING AND CUT OFF MECHANISMS

Figure 18:
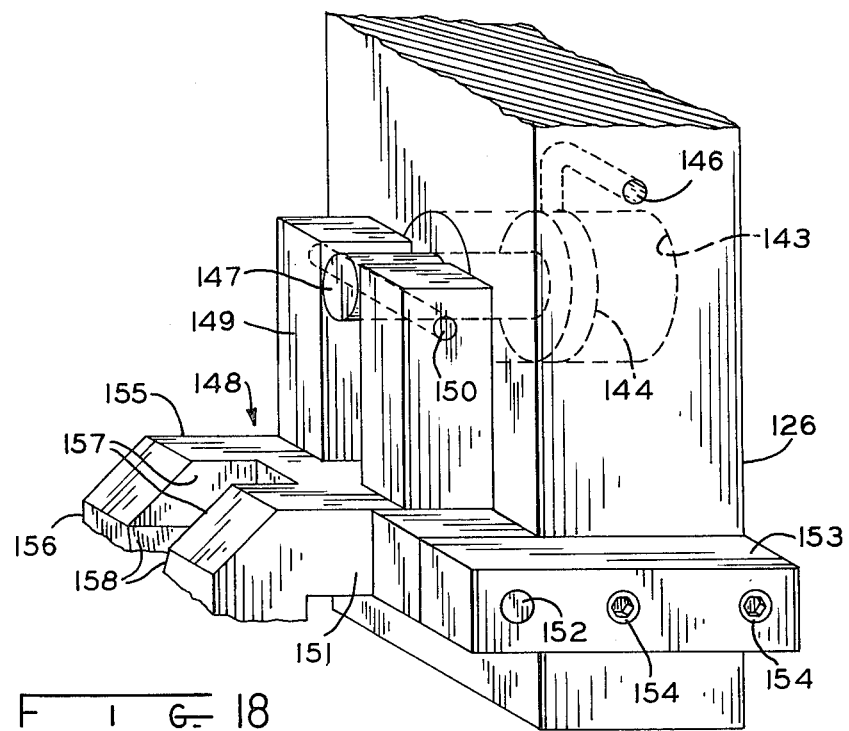
FIG. 18 is a fragmentary perspective of the gripper and its mounting on the lead-connecting mechanism.

Between the head block 126 and support block 127 is mounted an adjustable slide device indicated generally by the reference numeral 141 having a crank 142 connected to a screw (not shown) for adjusting the head block 126 vertically with respect to the support block 127. While this adjustment 141 is optional, it is important that for whatever position of adjustment, the head block 126 be rigidly supported with respect to the support block 127. As shown more clearly in FIGS. 14 and 18, head block 126 is provided with a double acting air gripper cylinder 143 which receives for reciprocation a piston 144. Suitable air passages 145 and 146 lead to the opposite ends of the cylinder 143 for alternatively supplying and exhausting air under pressure to the opposite sides of the piston 144 for reciprocating the same. A piston rod 147 is connected to the piston 144 and extends beyond the end face (left side, FIG. 6) of the head block 126 as shown. A crank shaped gripper member indicated generally by the reference numeral 148 has one arm 149 pivotally connected by means of a pin 150 to the exposed end of the piston rod 147 as shown and its elbow 151 pivotally connected to the head block 126 by means of a pivot pin 152 mounted in two small supporting blocks 153 secured to the sides, respectively, of the head block 126 by means of threaded fasteners 154. The two pins 150 and 152 are arranged parallel and horizontal.

The arm portion 149 of the gripper member 148 is bifurcated as shown so as accommodate the piston rod 147 therebetween. The other arm of the gripper member 148 has two right angle sections 155 and 156 as shown in FIG. 19 with the section 155 being arranged generally horizontal and the section 156 vertical. The member 148 as composed of the two sections 155 and 156 is bifurcated to provide a central opening or slot 157. The facing surfaces of the slot 157 are of complementary shape, each being in two discrete portions, the upper surface portion 158 being inclined as shown and the lower surface portion 159 being radiused. As is clearly shown in FIG. 15, the curve of portion 159 provides a clearance opening for the hook-operating rod 124, this rod and the hook element 119 being normally disposed midway between the surfaces of the gripper slot 157 with the hook element 119 being flat and vertically aligned midway therebetween.

Figure 14:
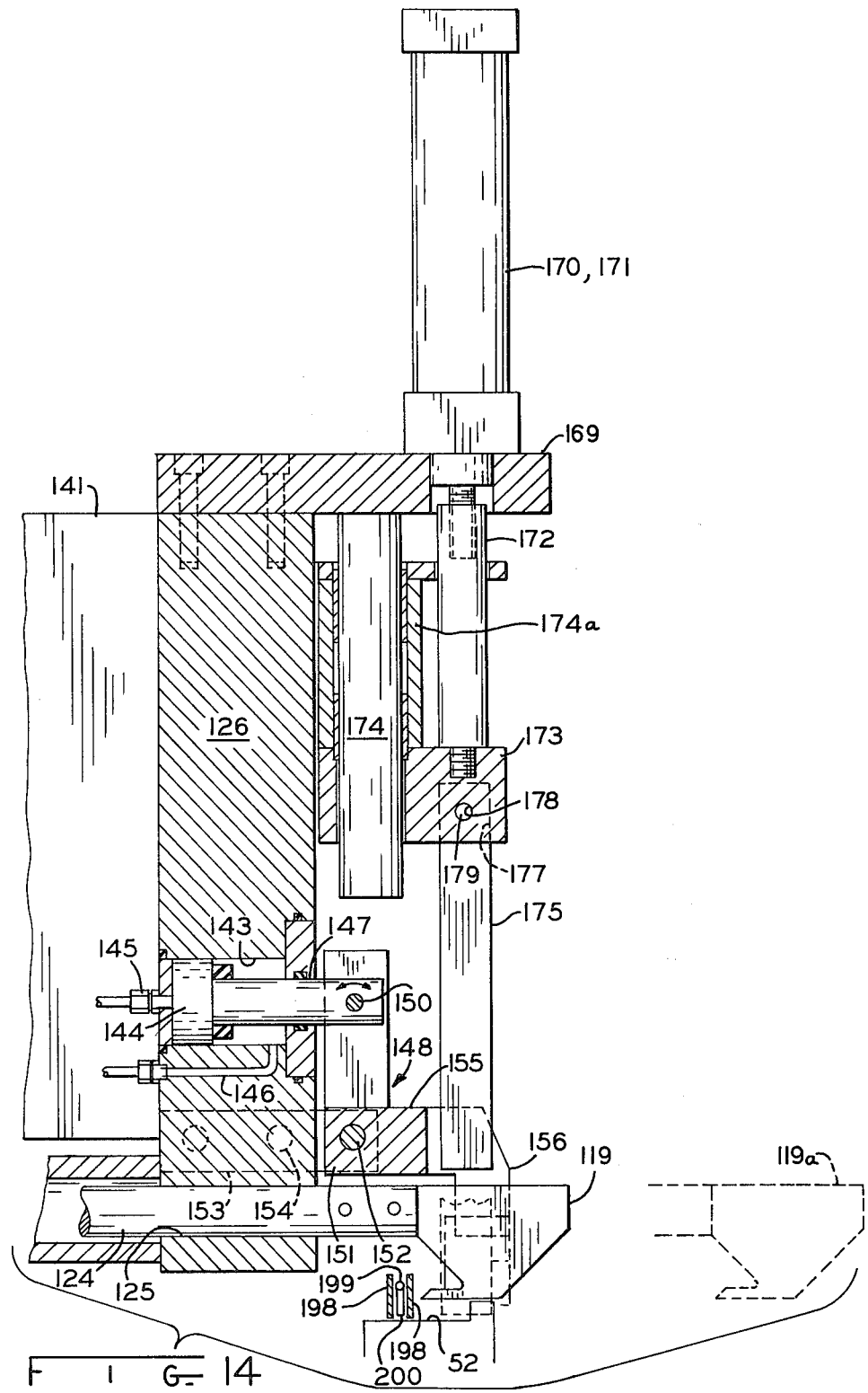
FIG. 14 is a view similar to FIG. 13 but of another portion of the lead-connecting mechanism, this figure being taken substantially along section line 14—14 of FIG. 15.
Figure 15:
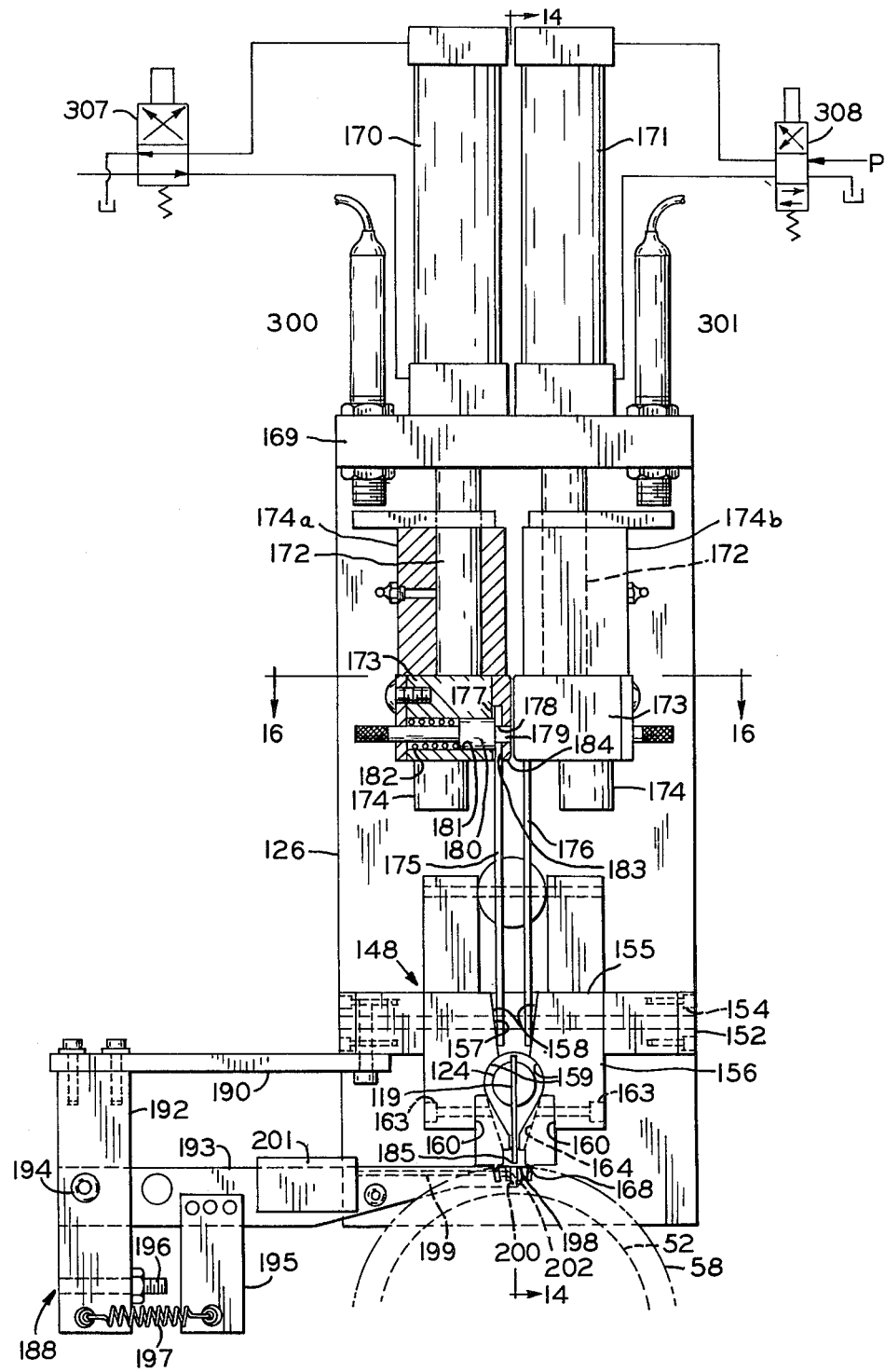
FIG. 15 is an end view of that portion of the lead-connecting mechanism shown in FIG. 14.

Viewing FIGS. 14 and 15, it will now be noted that the hook element 119 is reciprocable from a first position as shown in FIG. 14 where it resides within the gripper slot 157 and to a second position indicated by the dashed lines 119a forwardly thereof. The significance of these two different positions will be explained more fully later on.

Still referring to the gripper member 148 and more particularly to the bifurcated section 156 thereof, each furcation has a right angle notch 160 formed in the bottom thereof. The two notches 160 thus formed receive two gripper blocks 161 and 162 identically shaped but in reverse as more clearly shown in FIGS. 15, 19 and 20 such that a description of one will suffice for both. The gripper blocks are secured to the furcations 156 of the gripper member by means of threaded fasteners 163. Each block 161 is provided with a first ramp surface 164 which at its upper end smoothly merges into the respective radius 159. The outer end portion of the gripper block is formed with a laterally extending wall segment 165 radiused at 166 as shown which serves as a wire-retaining ledge as will be explained more fully later. As shown more precisely in FIGS. 21, 22 and 23 in somewhat enlarged detail, the two wall segments 165 have facing parallel surfaces that define a slot therebetween which receives with only slight clearance the hook element 119. The portions 167 of the gripper blocks 161 and 162 beneath the radiused ledges 166 are vertically straight and merge with the lower end of the inclined ramps 164. The two spaced surfaces 167 (FIG. 21) are parallel to each other and also to the facing surfaces on wall segments 165 thereabove. The spacing between the surfaces 167 is somewhat critical as determined by the spacing of the slots in the commutator riser 58 (FIGS. 1, 2 and 21) as explained later.

Each gripper block 161 and 162 is provided with a tooth 168 on the underneath side thereof, these teeth being engagable with spaced riser slots such as R-0 and R-3 as shown in FIG. 21. Each tooth 168 is provided with an inclined side for a purpose which will be explained more fully later on but which for the present may be noted as engaging the corner of the slot thereby to reinforce the riser lands while coil leads are inserted into the riser slots R-1 and R-2.

Briefly summarizing and referring to the operation of the gripper member 148, reciprocatory movement of the piston 144 (FIGS. 13 and 14) results in corresponding pivotal movement of gripper member 148 about pin 152 for moving the gripper block 161 and 162 between two different positions, the first being in engagement with the commutator riser as shown in FIGS. 14, 15 and 21 and to a second position elevated therefrom at which the gripper blocks 161, 162 are spaced from the riser 58. Switches (as explained later) operate spring biased solenoid valve 312 which connects to cylinder 143. The hook 119 is arranged to reciptrocate within the gripper furcations 156 and between the gripper blocks 161 and 162 while the gripper blocks are engaged with the riser.

Referring now to FIGS. 14 and 15, a mounting plate 169 is secured to the top portion of the head block 126 to overhang the end (left side, FIG. 6) thereof. Two hydraulic double acting, blade cylinders 170 and 171 of identical construction are secured to the plate 169 such that the piston rods 172 thereof are upright and parallel. The piston rods 172 at the lower ends are secured to two blade-connecting blocks 173 which in turn are slidably mounted on two vertical oriented guide bars 174 secured at the upper ends to the overhanging mounting plate 169. These guide bars 174 are arranged parallel to the piston rods 172. Thus, reciprocation of the blade cyliners 170, 171 results in vertical movement of the respective blocks 173 on the vertical guide bars 174.

Figure 16:
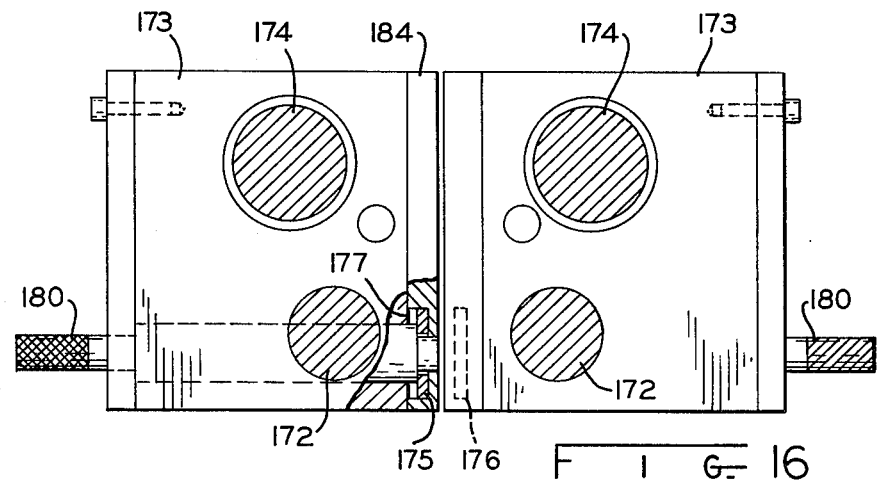
FIG. 16 is a cross section taken substantially along section line 16—16 of FIG. 15.

Yieldably connected to the two blade-mounting blocks 173 are two elongated flat metal blades 175 and 176, these blades being arranged vertical in parallelism with the respective piston rods 172. The blades 175 and 176 are generally rectangular with the upper end fitting into rectangular sockets 177 formed in the respective blocks 173. Each blade 175, 176 is provided with a mounting hole 178 which receives a reduced diameter end 179 of a plunger 180 transversely slidably received within a bore 81 in the block 173. A helical compression spring 182 biases the plunger 180 against the side of the respective blade 175 which in turn is urged against the side 183 of the socket 177 formed by a spacer plate 184 secured to the side of the block 173. The socket 177 is formed between one side of the block 173 and the spacer plate 184 as shown more clearly in FIGS. 15 and 16.

Thus mounted, the blades 175 and 176 are held against pivotal movement about the respective retaining pins 179 but on the other hand may deflect laterally (right and left as viewed in FIG. 15) by reason of the respective cavities 177 being slightly deeper than the thickness dimensions of the blades 175, 176 and the yieldability of the respective plungers 180.

With the blade cylinders 170 and 171 in their uppermost positions, the lower ends of the two blades 175 and 176 will be disposed within the gripper member 148 in engagement with the inclined surfaces 158 as shown. This may be regarded as the uppermost position of the two blades 175 and 176. Operating the two cylinders 170 and 172 to their opposite positions results in lowering the two blades 175 and 176 into the riser slots such as R-1 (60) and R-2 (60) as shown in FIG. 21. In moving downward, and briefly referring to FIG. 21, the blade 176 for example engages inclined surface 164 of the gripper block 162. This results in deflecting blade 176 leftward which movement is accomadated by the resilient connection between the upper end of the blade 176 and the blade-mounting block 173. As further noted in FIG. 21, the blade 175 has been moved further downwardly until the lower end thereof lies adjacent to and to the rear of the bottom edge of the radiused ledge portion 166 of the wall segment 165. It will now be seen that the facing surfaces 164 and 167 of the gripper blocks 161, 162 serve in guiding the two blades 175 and 176 into two adjacent riser slots, such as slots R-1 and R-2 in FIG. 21. The connections of the blades 175 and 176 with the respective mounting blocks 173 permit lateral deflection to an extent as will permit blades 175 and 176 to be guided into the riser slots.

Again with reference to FIGS. 15 and 21, it should be noted that the hook 119 has its lower edge 185 disposed immediately adjacent to the outer periphery of the riser 58 of the commutator. Also, the opposite sides of the hook 119 are spaced from the two gripper block surfaces 167 thereby defining two guide channels 186 and 187 therewith (FIG. 21). These guide channels 186 and 187 are of a size to coincide substantially with riser slots R-1 and R-2 and thus may be regarded as radial extensions thereof. The hook 119 is provided with a thickness that coincides with the land portion of the riser 58 between two adjacent riser slots R-1 and R-2. The hook 119 in combination with the two gripper block surfaces 167 therefor serve as blade-guiding channels which will direct the blades 175 and 176 precisely into riser slots which are properly positioned with respect thereto.

The two blade cylinders 170 and 171 are independently operable such that the two blades 175 and 176, may be independently moved into operative engagement with the respective riser slots. Proximity switches 300 and 301 (FIG. 15) sense the "up" blade positions by reason of bearing blocks 174a and 174b and moving upwardly into proximity with switches 300 and 301, respectively. Cylinders 170 and 171 are controlled by spring biased solenoid valves 307 and 308, respectively connected to switches 300 and 301, these valves being triggered to stop and hold cylinders 170 and 171 in "up" positions by switches 300 and 301.

An optical sensing device, indicated generally by the reference numeral 188 (FIG. 15) is sensed to the bottom portion of head block 126 and is generally disposed therebelow. The device 188 includes a bar 190 extending laterally from head 126, an upright support member 192 secured to the bar 190 and a horizontally extending arm 193 pivotally secured at the left end to the support 192 by means of a pivot pin 194. The arm 193 has an abutment element 195 secured thereto and depending therefrom which may be moved into engagement with a stop screw 196 on the support 192. A tension spring 197 is connected at its opposite ends to the abutment plate 195 and the support 192 for urging the arm 193 clockwise about the pivot 194.

The right hand end of the arm 193 which is bifurcated and also indicated by the numeral 198 is disposed immediately above the commutator 52 as further shown in FIG. 14. Between the furcations of the lever end 193 is disposed an optical sensor 199 having a downwardly bent end 200 disposed immediately adjacent to the surface of commutator 52. The opposite end of the sensor 199 is secured to a suitable support 201 carried by the arm 193. End 198 of the arm 193 is also angled as indicated by the numeral 202 to facilitate moving the commutator 52 from the right toward the left as viewed in FIG. 15 when the armature is initially loaded into the machine in winding position. The spring 197 holds the lever end 198 in operative engagement with the commutator so that the sensor 200 can "see" the mica strips 59 and commutator slots (FIG. 1) as earlier explained.

Figure 17:
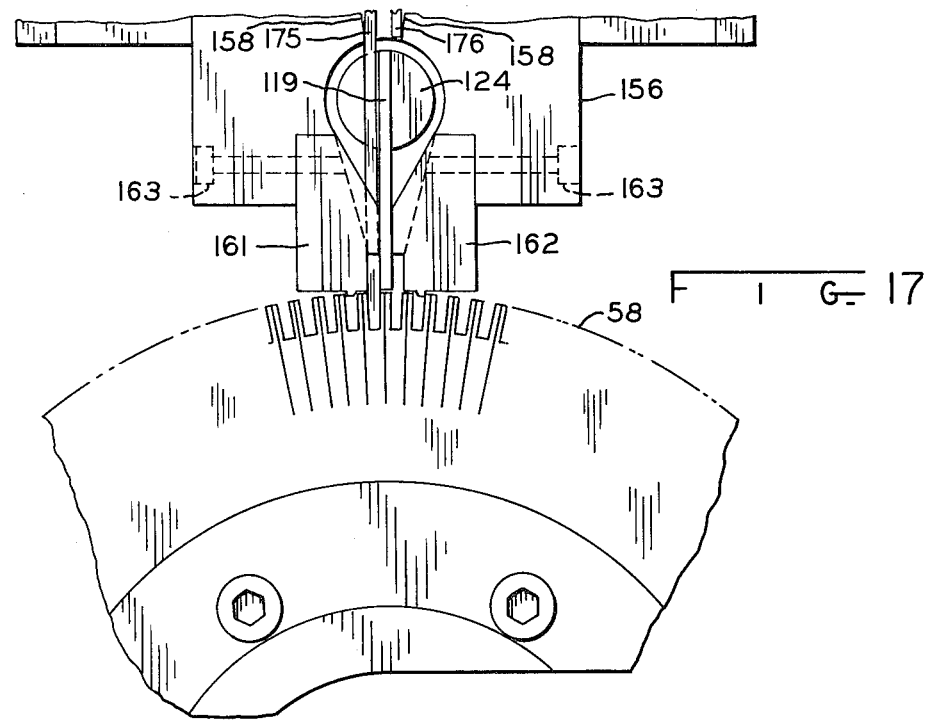
FIG. 17 is a further view of the lead-connecting mechanism shown in FIG. 15 but with one of the blade elements entered into the slot of the commutator riser.

It may now be explained that the optical-sensing device 188 is operatively connected to the positioner motor 100 and its valve 306 (FIGS. 12a and 12b) for deactuating motor 100 when the lead-connecting mechanism 78 (viewed from the position shown in FIGS. 15 and 17) rotates from a clockwise position to a counter clockwise position at which the sensor 199 comes into registry with a mica strip 59 between two commutator bars. When this occurs, the positioning screw 101 serves in locating the head block 126 and the gripper 148 carried thereby in precise registry with two adjacent riser slots, such as R-1 and R-2 as shown in FIG. 21.

WINDING MECHANISM

Figure 33:
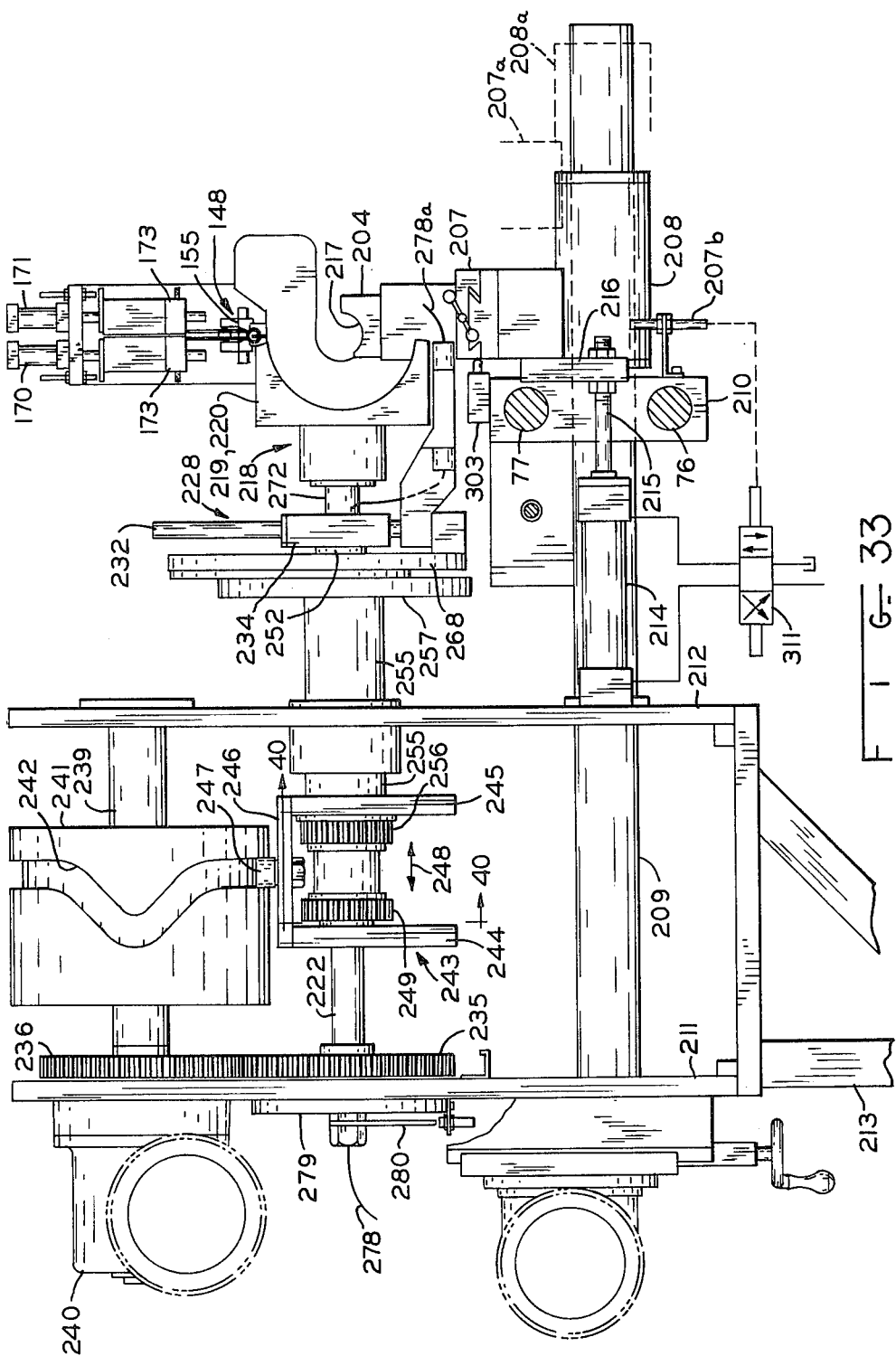
FIG. 33 is an end view of the machine opposite from that shown in the earlier FIGS. 8, 9 and 12.

Referring to FIGS. 6, 7 and 33, the armature 50 which is to be wound is shown as being loaded into the machine and supported on two spaced apart pedestals 203 and 204 secured to bases 205 and 206, respectively, mounted on a slide bed assembly or carriage 207. The slide bed assembly 207 is affixed to two horizontally spaced sleeve bearings 208 slidably mounted on two horizontally extending slide bars 209 which are secured to two rectangular blocks 210 slidably supporting for horizontal adjustment on the two main frame rods 76 and 77, respectively. The two slide bars 209 project readwardly where they are secured to two spaced apart, upright frame plates 211 and 212, these frame plates being supported from the floor by means of suitable legs 213. A double acting hydraulic cylinder 214 is secured to the frame plate 212 and has its piston rod 215 connected to a plate 216 which in turn is suitably connected to the bearing sleeves 208. Thus, the bed 207, the sleeve bearings 208 and the plate 216 constitute a unitary assembly which may be horizontally reciprocated on the slide bars 209 by means of the hydraulic cylinder 214. The hydraulic cylinder 214 is actuable to move the pedestals 203 and 204 between three different horizontal positions, the first being as shown in FIG. 33 in which the armature 50 is moved into winding position, a second extended position to the right thereof as shown by the dashed lines indicated by the numerals 207a and 208a, and a third intermediate position in which the left end of sleeve 208 registers with proximity switch 207b. In position 207a, the armature may be manually placed or removed from the two pedestals 203 and 204.

Actuation of cylinder 214 is controlled by solenoid valve 311 (like valve 305) connected to manual "start" switches 208b and 208c (FIG. 49), limit switch 303 (FIGS. 33, 49), and proximity switch 207b. With bed or carriage 207 in position 207a, closure of switches 208b, 208c energizes valve 311 to actuate cylinder 214 to move carriage 206 to its "armature-loaded" position (FIG. 33). When carriage 207 reaches its "armature-loaded" position, limit switch 303 is activated to operate valve 311 to its neutral or "off" position thereby holding cylinder 214 and carriage 206 in such "armature-loaded" position.

As shown more clearly in FIG. 33, the pedestals 204 have the upper extremities radiused at 217 to conform to the curvature of the armature shaft for positively locating the armature in position.

An armature-positioning shroud assembly indicated generally by the numeral 218 and as shown in FIGS. 33, 34 and 41 includes two spaced semicircular end shrouds 219 and 220 rigidly mounted on a supporting bar 221 (FIG. 34). The curvature of these end shrouds 219 and 220 is made to conform to the curvature of the armature core 50 such that the core may be nested therein when the armature is loaded in the machine for winding. As shown more clearly in FIGS. 33 and 41, the shroud assembly 218 is carried on the end of a winder shaft 222 by means of a rotary bearing 223, this bearing 223 being retained on the shaft 222 against relative axial movement thereon but being free to rotate. The shaft 222 is also free to rotate but is held against axial movement.

Returning to FIG. 34, a finger assembly, generally indicated by the numeral 224 is mounted on the shroud bar 221 for determining the rotated position of the armature 50 when it is nested within the end shrouds 219 and 220. This finger assembly 224 includes a mounting block 225 having two fingers 226 and 227 pivotally connected thereto, the fingers 226 and 227 being spring biased toward each other. As the armature is moved from its outer position as indicated by the numeral 207a and 208a in FIG. 33 to its winding position at which it is nested into the end shrouds 219 and 220, during a portion of this movement, the core 51 of the armature will come into engagement with the distal ends of two fingers 226 and 227, the finger 226 engaging an edge of one of the slots 62 (otherwise indicated by the numeral 62c in FIG. 36) following which continued movement of the armature in the direction of the arrow "F" will cause rotation of the armature until it is completely nested within the end shrouds 219 and 220. Thus rotated, the armature is now in readiness for having a coil wound (by means of eyelet 229) in a slot pair of the core.

A winding head assembly, indicated generally by the numeral 228 (FIGS. 33, 34 and 39 through 42) is mounted on the shaft 222 for rotation therewith. This assembly includes a flyer winder or eyelet 229 carried by a winder frame block 230 which is secured to two spaced apart and parallel slide rods 232. These slide rods 232 are tied together by a cap bar 233 and otherwise are slidably mounted in a guide block 234 secured to shaft 222 for rotation therewith. The slide rods 232 are disposed in a plane at right angles to the axis of the shaft 222. The eyelet 229 thus mounted can be moved radially with respect to the shaft 222.

Figure 39:
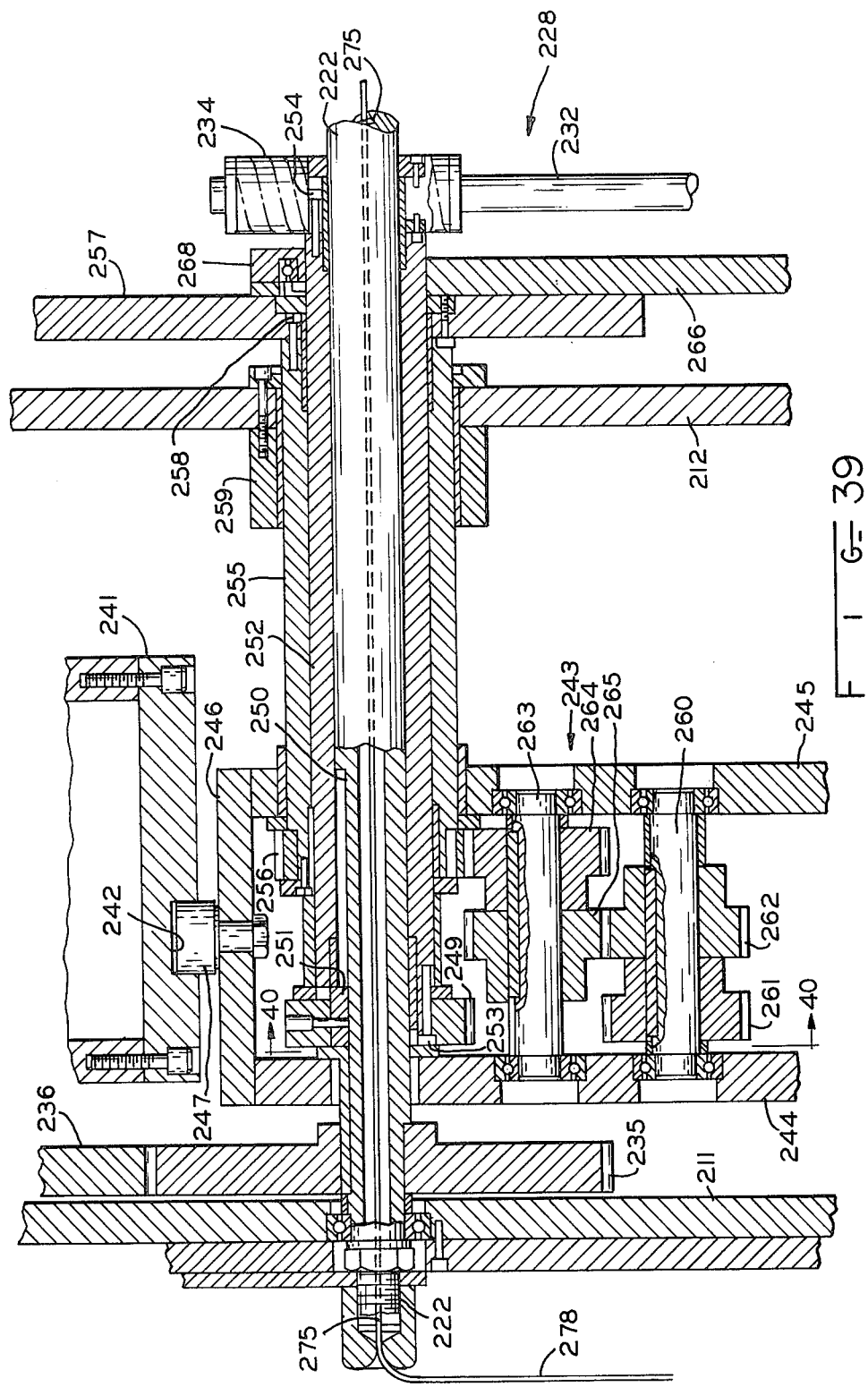
FIG. 39 is a fragmentary sectional view taken substantially along section line 39—39 of FIG. 38.
Figure 43:
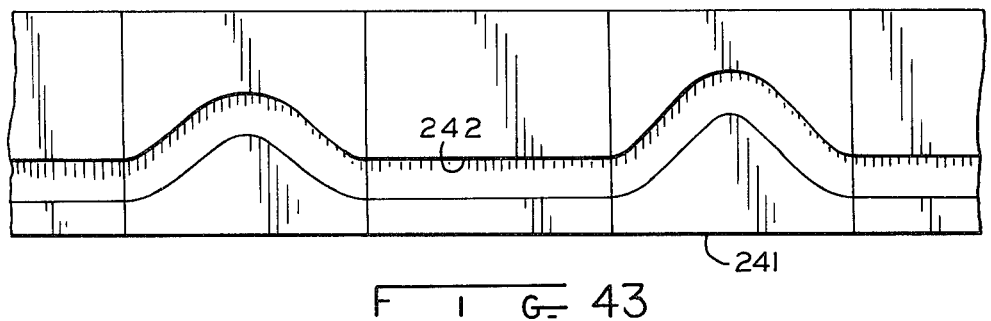
FIG. 43 is a diagrammatic layout of the configuration of the barrel cam shown in FIG. 33.

With the eyelet 229 mounted as shown, it can be rotated about the armature 51 from end to end thereof in alignment with the core slots into which a coil is to be wound. The shaft 222, as shown more clearly in FIGS. 33 and 39, is journalled for rotation in two upright frame plates 211 and 212. On the left end of the shaft 22 (FIG. 33) is secured a driven gear 235 which is meshed with driving gear 236 mounted on a drive shaft 237 also journalled in the frame plates 211 and 212. The two shafts 222 and 239 are parallel. A suitable driver motor 240 (FIGS. 33, 38) is mounted on the frame plate 211 and is suitable connected to the shaft 239 and gear 236 for rotating the same. A cylindrical barrel cam 241 is mounted on the shaft 239 for rotation therewith. A cam slot 242 is provided in the periphery of the barrel cam 241, the shape of the cam slot 242 to be explained in more detail later.

Mounted on the shaft 222, as generally shown in FIG. 33, is a gear train assembly indicated generally by the numeral 243. This gear train assembly 243 includes two side plates 244 and 245 secured together and in parallelism by an end plate 246. Mounted on the end plate 246 is a cam follower or roller 247 which is received by the cam slot 242 in the barrel cam 241.

The gear train assembly 243 as a unit is mounted on the shaft 222 for reciprocation only and otherwise is held against rotation with the cam follower 247 engaged with the cam slot 242. By reason of this mounting, the assembly 243 and more particularly the carrier frame 244, 245 and 246 can reciprocate in the direction of the double ended arrow 248 as caused by the undulations in the barrel cam groove 242.

Within the assembly 243 are meshed gears for rotating coaxial shafts oppositely, such shafts being shown, for example, in FIG. 39. Referring first, however, to FIG. 33, a first gear 249 is mounted on shaft 222 for rotation therewith but is capable of axial sliding movement relative thereto by reason of a keyway 250 which receives a key 251 fitted to the gear 249. As the shaft 222 is driven, the gear 249 is rotated therewith but can slide or move axially thereon by reason of the sliding engagement of the key 251 with the keyway 250.

A second shaft 252 as shown in FIG. 39, coaxially surrounds the shaft 222 and is connected at its left end to the gear 249 by means of threaded fasteners 253. Thus, the two shafts 222 and 252 rotate in unison. At the right hand end, the shaft 252 is connected to the eyelet carrier block 234 by means of threaded fasteners 254.

A third shaft 255 is coaxially mounted for rotation on the second shaft 252 (FIGS. 33 and 39) and has secured to the left hand end thereof a gear 256 by means of which the shaft 255 is rotated oppositely to the direction of rotation of the two shafts 222 and 252. On the right hand end of the shaft 252 (FIG. 39) is secured a drive plate 257 by means of threaded fasteners 258. A sleeve bearing 259 in the frame plate 212 mounts the shaft 255 for rotation therein.

Figure 40:
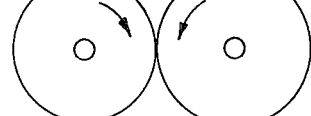
FIG. 40 is a fragmentary sectional view of the gear train taken substantially along section line 40—40 of FIG. 39.

A series of gears not visible in FIG. 33 are meshed between the two gears 249 and 256 for driving the gear 256 opposite to that of the gear 249. This gear arrangement is shown more particularly in FIG. 39 wherein the reversing gear train is developed into a flat plane whereas in reality the gear arrangement is as shown in FIG. 40. Referring to FIG. 39, a first shaft 260 which extends parallel to the shaft 222 has its opposite ends journaled in bearings mounted in the two plates 244 and 245. A pair of gears 261 and 262 are fixedly secured together for rotation in unison on shaft 260. The gear 261 is meshed with gear 249.

Another shaft 263 which also extends parallel to shaft 222 has its ends journaled in bearings in the two plates 244 and 245. Two gears 264 and 265 fixedly secured together are mounted on the shaft 263 for rotation in unison. The two gears 262 and 265 are meshed and the gear 264 is meshed with the gear 256. The gear ratios are so selected that the two shafts 252 and 255 are driven at the same speed but in reverse. The driving and driven gears 236 and 235, respectively, are of a one-to-one ratio, being of the same size and having the same number of teeth.

FIG. 40 shows the actual meshed relationship between the gears of the gear train assembly 243.

Referring to FIGS. 33, 39, 41 and 42, a circular plate 266 is radially adjustably secured to plate 257 in parallelism therewith by means of threaded fasteners 267. The plate 266 is disc shaped and eccentrically mounted with respect to shaft 252 to be rotatable thereabout in unison with shaft 255 and plate 257. Rotatably mounted on the periphery of the eccentric plate 266 is a cam plate 268, this mounting being provided by a ball bearing assembly 269. A coplanar ear 270 extends outwardly from the cam plate 268 as shown in FIGS. 41 and 42. The various dimensions of this eccentric assembly are so selected as to provide for the size of path described by the flyer winder or eyelet 229 as it swings about the shroud assembly 218; however, adjustments may be provided such as by means of a block 271 (FIG. 42) disposed within a slot 272 and the eccentric plate 266 and engaged with the shaft 252. By shortening this block 271, the shaft 252 may be moved closer to the center of the eccentric plate 266 thereby modifying the size of the path that would be followed by the eyelet 229 as it swings about the shroud assembly 218. Threaded fasteners 267, 273 mounted in slots in eccentric plate 266 accommodate this adjusting feature and upon tightening serves in securing the two plates 266 and 268 together.

In the working embodiment of the present invention, the eyelet 229 rotates counterclockwise about the shroud assembly 218 as viewed in FIG. 6. The eccentric plate 266 is caused to rotate clockwise which results in the eyelet 229 describing a noncircular pattern depending upon the eccentric adjustments and positioning of the various parts. Such positions and adjustments are selected so as to cause the eyelet 229 to describe an essentially horizontal rectangular pattern as shown in FIG. 5a with the opposite sides being essentially straight and parallel (horizontal) and the ends slightly rounded. The eyelet 229, however, is further moved laterally while traversing the ends 274 of the path this being shown graphically in FIGS. 5b and 5c. This lateral curvature 274 is provided by the reciprocation of the gear train assembly 243 on the shaft 222. This reciprocation is provided by the cam groove 242 in the barrel cam 241 which causes reciprocation of the gear train assembly 243 in response to rotation of the barrel cam 241. More specifically, and referring to FIG. 6, the eyelet 229 describes a path which completely encircles the core of the armature 50 from end-to-end winding a coil in the core slots that are substantially diametrically opposed. The eyelet 229 traverse essentially straight paths from end-to-end of the core in substantial parallelism with the surface thereof and at the ends curves thereabout describing the essentially rectangular shape as shown in FIG. 5a with the straight, flat sides and slightly curved ends. This particularly winding operation is further explained in connection with FIG. 26.

To provide wire to the eyelet 229, the shaft 22 is hollow, having a central passage 275. As shown more clearly in FIG. 41, near the righthand end of the shaft 226 but just short of the shroud bearing assembly 223, the shaft 222 is provided with a radial passage 276 that communicates with the righthand end of central passage 275. At this juncture, a roller 277 is fitted within the shaft 222 with the periphery thereof coinciding with the sides of the two passages 275 and 276. Wire to be wound on the armature is indicated in FIGS. 39 and 41 by the numeral 278, this wire being threaded through the shaft 222 beginning at the lefthand end thereof (FIG. 39) and extending out of the passage 276. From there the wire 275 is threaded through the eyelet 229, the wire end which emerges from the eyelet 229 being indicated by the numeral 278a (see FIG. 26c also). By pulling on the end 278a, the wire 278 may be drawn completely through the shaft 222 with little frictional resistance.

Referring more specifically to FIGS. 33 and 38, a disc-shaped plate 279 is secured to rear frame plate 211 by any suitable means coaxially of the shaft 222. A rotational, position-sensing arm 280 is secured at one end to the shaft 222 to rotate therewith. It will be noted that the arm 280 is of a length just short of the radius of the plate 279. Three sensors in the form of proximity switches 281, 282 and 283 are mounted on the periphery of the plate 279 in circumferentially spaced relation in registry with the rotational path of the distal end of arm 280. The precise spacing of these proximity switches is for the purpose of providing the desired starting, stopping and reversal of the eyelet 229 in its winding operation, a control circuit (FIGS. 44–51) incorporation these proximity switches providing for this operation.

Figure 26E:
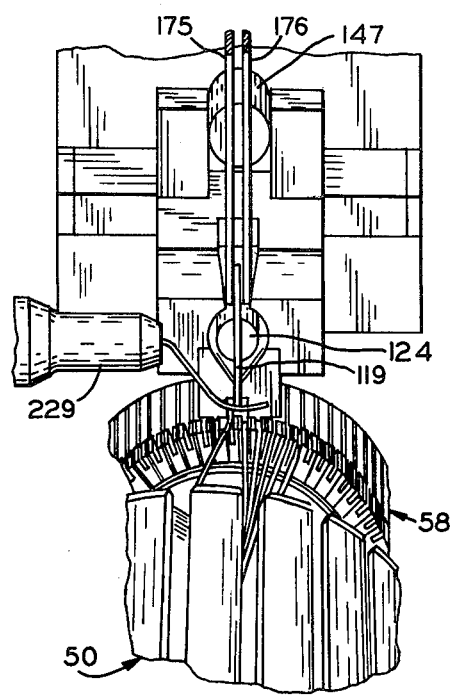

Referring to the proximity switches 281, 282 and 283 (FIG. 38), the switch 281 is for the purpose of counting the number of turns wound in a given coil (FIG. 5a). Machine operation is started by activating the manual switches 208b, 208c (FIG. 49). At "start", the sensing arm 280 is as shown in FIG. 38 and the eyelet 229 as shown in FIG. 26a. When the machine starts operating, rotation of the sensing arm 280 is in the direction of the arrow "F". As the sensing arm passes switch 281, the counter in the electronic controller (FIGS. 50 and 51) starts operating. When the arm 280 passes switch 281 the required number of times, for example three, the switch 281 activates the machine stop cycle (a function of the electronic controller (FIGS. 44–51) and at that time causes the machine to slow down until the arm 280 reaches the proximity switch 283. Upon coming into registry with the switch 283, the machine stops (eyelet as in FIG. 26c) and reverses for a short distance until the arm 280 comes into registry with the switch 282. At that time the machine stops and the eyelet is as shown in FIGS. 26a and 26b. These functions are programmed into the controller (FIGS. 44–51).

The angular spacing between the two switches 281 and 283 is for permitting the machine to slow down until the arm 280 reaches the switch 283 at which time the flyer winder 229 is stopped and goes into reverse. The angular spacing between the two switches 282 and 283 is for the purpose of determining the distance of reversal and also serves to provide slack in the wire from flyer winder 229 to reach from the core to the commutator as explained in connection with FIGS. 29, 29a, 30, 31, and 32.

COIL LEAD-FORMING ASSEMBLY

Referring now to FIGS. 6 and 29 through 32, the mechanism for forming the coil leads which extend between the coils wound on the armature core and the commutator will be described. On the sliding bed or carriage 207 is mounted a forwardly extending support plate 284 having an upstanding post 285 rigidly secured thereto. A lever 286 is pivotally connected at one end to the upper end of the post 285, this pivotal connection being provided by means of a pin 287. As shown in FIG. 29, the lever 286 is shown in its upper, fully retracted upright position. A proximity switch 302 (FIG. 31a), senses this upright position and activates solenoid valve 310 (like valve 305) which deactuates rotary actuator 288 as the lever 286 raises from horizontal and reaches its upright position. As shown in FIG. 30, the pin 287 is actually the rotary output shaft of a hydraulically operated rotary actuator 288 which is mounted on the upper end of the post 285. The rotary actuator 288 may be controlled in this operation to swing the lever 286 from its fully upright position shown in FIG. 29 to a horizontal position as shown in FIGS. 29a and 30.

An elongated cam bar 289 is pivotally connected at its lower end to the base plate 284 by means of a pivot pin 290. In the upper end portion of this cam bar 289 and extending longitudinally thereof is a cam slot 291 which is straight for its uppermost portion but curved as shown in its bottom portion. This bottom portion is curved along an arc having the axis of pin 287 as its center.

A cam follower 292 carried by the lever 286 is received by the cam groove 291. Thus, as the lever 286 swings between its upper and horizontal positions, the cam bar 289 will be moved between its two extreme positions shown as being upright and forwardly as at 289a (FIG. 29a).

A wire guide or guide finger 293 is secured rigidly at one end to the cam bar 289 such that when the cam bar 289 is fully upright and the lever 286 is horizontally positioned, the guide finger 293 will also be horizontally positioned with the distal end 294 thereof being precisely located opposite the nearest edge of the core slot 62 in the armature core 51. The end 294 thus serves as an axial extension of the nearest side of the core slot as further shown in FIG. 31. Then as shown in FIGS. 31 and 32, it will be seen that the lever 286, otherwise referred to as a wire form or former, in the operative position is located radially adjacent to the armature shaft 64 and within the periphery of the armature core 51 and commutator 52.

In explaining the operation of the wire former and wire guide 286, 293, with the assembly operated to its upright, retracted position, as shown in FIG. 29 (on same sheet with FIGS. 19 and 20), and with the armature 50 located in the winding shrouds 219, 220 and properly rotated by means of the locating fingers 226 and 227, a length of wire is pulled from the eyelet 229, as indicated by the numeral 278b, and is inserted and fastened into one of the riser slots in the commutator riser 60 (FIG. 32). It will be noted that this length of wire 278b, otherwise referred to as a coil lead, extends substantially straight from the eyelet 229 to the riser 60. Since the finished armature coil or winding should be tightly bunched about the armature shaft 64, it is obvious that the lead 278b cannot be permitted to remain in this position. With the eyelet 229 in the position shown, and this position being that at which a coil winding operation is started, the wire former and wire guide assembly 286 and 293 is actuated causing the latter to lower to the positions shown in FIGS. 26b, 29a, 30, 31 and 32. Almost simultaneously, the wire former 286 engages the wire 278b depressing it toward the armature shaft 64 to the position indicated by the numeral 278c. Slack wire from eyelet 229 caused by the eyelet reversal from proximity switches 282 and 283 is so depressed; otherwise wire is drawn from the eyelet 229 in depressing the lead to this position. Also, the wire guide 293 is positioned with its distal end 294 coinciding with the near edge of the slot 62 into which the first coil is to be wound. The end 294 which projects slightly above the armature periphery as shown in FIG. 32 therefore serves as a guide assuring that the start of the eyelet 229 in the direction of the arrow "F" (FIGS. 31 and 32) will lay the wire squarely into the slot 62 and will prevent the wire from hanging up on the corner thereof.

MACHINE OPERATION

Figure 25A:
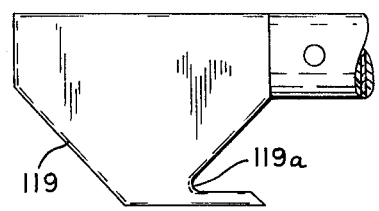
FIGS. 25a and 25b are side and bottom views, respectively, of the hook only, FIG. 25b showing a coil lead captured by the hook.

With an armature properly positioned in the winding shrouds 219, 220 of the winding mechanism as previously explained, the lead-connecting mechanism 78 is operated to a pre-adjusted extreme counterclockwise position as viewed from the left end of the mechanism 78 (otherwise as viewed in FIG. 15). This position of the lead-connecting mechanism 78 as explained previously is determined by the full retraction of the gear rack 95 (FIGS. 12a and 12b) as sensed by the proximity switch 98. With the eyelet 229 at its "start" position as sensed by proximity switch 282 and as shown in FIGS. 31 and 32 a length of wire 278a is drawn from the eyelet 229 and is manually threaded through the wire-guiding channel 187 (FIG. 21) formed between the hook element 119 and the edge 167 of the gripper block 162. If desired, the extreme end of this wire may be bent over the recessed portion 119a (FIG. 25a) of the hook element 119 to retain the wire in the channel 187.

The reason for starting the machine operation with the lead-connecting mechanism 78 in its extreme counterclockwise position is to provide clearance for the armature 50 to be moved from the loading position 207a and 209a (FIG. 33) to the winding position in engagement with the winding shrouds 219, 220. When so moved, only a minimum clearance is provided between the gripper blocks 161, 162 and the commutator riser 58. With the mechanism 78 which carries the gripper blocks 161, 162 therewith moved sufficiently far counterclockwise, adequate clearance is provided for moving the armature into winding position.

The lead-connecting mechanism 78 is next moved clockwise to an extent as determined by the engagement of the rack 95 with the stationary positioning screw 101. This position has been previously determined by operation of the positioner motor 100 as sensed by the proximity switch 110 and further by the sensing switch 117 coming into registry with the sensing collar 116 on screw 101 (FIGS. 12a and 12b). The proximity switch 117 becomes registered with the collar 116 at the moment of engagement of the rack 95 with the positioning screw 101. Cylinder 94 and motor 100 are deactuated and held in position.

Having previously selected riser slot R-1 for the first coil lead connection, the clockwise position of mechanism 78 is predetermined to be that at which the wire-guiding channels 186 and 187 are disposed toward the right of the riser slot R-1 as otherwise shown in FIG. 28a. This rightward spacing is preset to be equal to about one riser slot width.

With hydraulic pressure maintained over the piston in head cylinder 94 in a direction holding rack 95 in engagement with positioning screw 101, positioning motor 100 is now actuated. Under the force of the positioning screw 101, the rack 95 (FIGS. 12a and 12b) is forced leftwardly at a slow rate causing the lead-connecting mechanism 78 to be rotated slowly counterclockwise. This counterclockwise movement continues until the optical sensor 200 (which is disposed immediately adjacent to the commutator periphery) "sees" the darker colored insulating strip 59 or commutator slot as shown in FIG. 28b. With the sensor end 200 thus registered with the insulator 59 and since the sensor end 200 is carried by the lead-connecting mechanism, the lead-guiding channels 186 and 187 will be precisely registered with the two riser slots R-1 and R-2 as shown in FIG. 28b. The sensor 199, 200 provides a signal which is utilized to deactuate positioning motor 100 thereby stopping the counterclockwise movement of the lead-connecting mechanism 78. This mechanism 78 is now in position to place the first coil lead 278a (FIG. 41) into riser slot R-1 (this coil lead is the same as that in FIG. 2 indicated by numeral 68-1).

Next, left hand blade 175 (FIGS. 15 and 28c) is lowered into riser slot R-2 and simultaneously therewith the gripper blocks 161 and 162 are lowered into engagement with the riser 58, the teeth 168 on the gripper blocks 161 and 162 entering the adjacent riser slots as shown with the inclined portions thereof engaging the corners of the riser slots thereby backing up the respective riser lands to prevent them from being bent over. This occurs by actuation of head and gripper cylinders 170 and 143 in response to the signal of sensor 199. The blade 175 substantially fills the slot R-2 thereby providing reinforcement for the riser land between slots R-1 and R-2. Lowering of the blade 175 is accomplished by actuating hydraulic cylinder 170 and lowering of the gripper blocks is caused by actuating hydraulic cylinder 143, 144 (FIGS. 14 and 15). Next in sequence, the control circuitry actuates blade cylinder 171, the righthand blade 176 lowers through guide channel 187 engaging the wire lead 278a (68-1 and "S-1") retained in the channel 187 as shown in FIGS. 28a and 28b and forces the wire lead into the riser slot R-1. The size of the wire 278 is slightly larger than the width of the riser slot such that the upon being forced thereinto, enamel insulation thereon is scraped off so that the bare metal of the wire engages the slot sides for making an electrical connection thereto. This step of the righthand blade 176 forcing the wire lead into the slot R-1 is shown in FIG. 28c, this wire lead otherwise being designated by the symbol S-1 denoting the starting connection of the coil to be wound on the armature.

With the wire lead S-1 in the riser slot R-1, the lead extending from the eyelet 229 if taut will be as indicated by the numeral 278b in FIG. 32. Now the machine circuitry causes actuation of the wire former and guide assembly 286, 293 (FIGS. 29 to 32) from the position shown in FIG. 29 to that shown in FIGS. 29a, 31 and 32. This operation results from actuation of the rotary actuator 288 (FIG. 30). The lead 278b is depressed to the position 278c (FIG. 32) and the end 294 of the wire guide 293 is disposed immediately adjacent to the end of the armature core 51 opposite the edge of the slot 62 into which the first coil is to be wound. The end 294 in its downward movement engages the lead 278b pushing it into alignment with the core slot 62.

The coil winding mechanism is now started into operation by actuating drive motor 240 (FIG. 33). The winding eyelet 229 now rotates counterclockwise (as viewed in FIG. 6) about the armature core threading wire 278a into the core slots 62a and 62b (FIGS. 1 and 3), the eyelet 229 tracing a path as explained in connection with FIGS. 5a, 5b and 5c. Assuming that it has been predetermined that three turns are to constitute a winding section (68a, FIG. 5), a counter in the control system counting about two and one-half turns causes the motor 240 to slow down while approaching the end of the third turn when arm 280 registers with switch 282 (FIG. 38). The end of the third turn as explained previously, is sensed by the proximity switch 283 which generates a signal that is utilized in deactuating motor 240. This stops the winding eyelet 229 at the position shown in FIG. 6 which is about midway between the ends of the armature core 51. This position is termed the "flyer stop forward position".

Figure 27A:
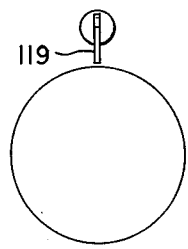
FIGS. 27a through 27d are diagrammatic illustrations showing the action of the hook as it is engaged with a coil lead extending from the fly winder.

Immediately following, the control system actuates the motor 240 in reverse at slow speed thereby causing the eyelet 229 to start movement clockwise. The length of this movement is very short and is stopped when the eyelet 229 approaches the righthand end of the armature core as otherwise shown in FIGS. 31 and 32. At this point, proximity switch 282 senses the rotated position of the arm 280 (FIG. 38) producing a signal utilized by the control system which stops the motor 240. The eyelet 229 is thus positioned as shown in FIGS. 31 and 32 otherwise denominated the "flyer stop reverse position". The reason for this slight reversal of the eyelet 229 is to provide slack in the wire between the eyelet 229 and the end of the winding just laid into the core slots. This marks the end of winding the first section 68a (FIG. 5) and leaves as the next step the connection of the end lead of the section to the slot R-2. The position of hook 119 relative to eyelet 229 is shown in FIG. 27a.

Figure 27B:
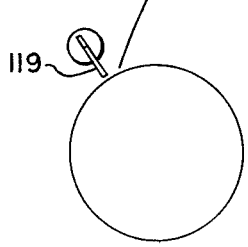

In order to connect this end lead, the following operational sequence occurs. Both cylinders 170 and 171 (FIGS. 14 and 15) are actuated in response to the eyelet stopping at the "flyer stop reverse position" to raise blades 175 and 176 to their uppermost positions (FIGS. 14 and 15) as sensed by proximity switches 300 and 301. The gripper cylinder 143, 144 is actuated raising gripper blocks 161 and 162 out of engagement with the riser. The wire forming and guiding assembly (FIGS. 29 to 32) is now raised to the retracted position shown in FIG. 29. Head cylinder 94 (FIGS. 12a and 12b) is now actuated to move the rack 95 to its leftward limit as sensed by the proximity switch 98 thereby swinging the lead-connecting mechanism 78 to its extreme counterclockwise position. This positions the hook element 119 to the left of the eyelet 229 (as viewed in FIG. 14) as shown in FIG. 27b. FIG. 27a shows the position of the hook 119 at the end of winding the first section.

Figure 26F:
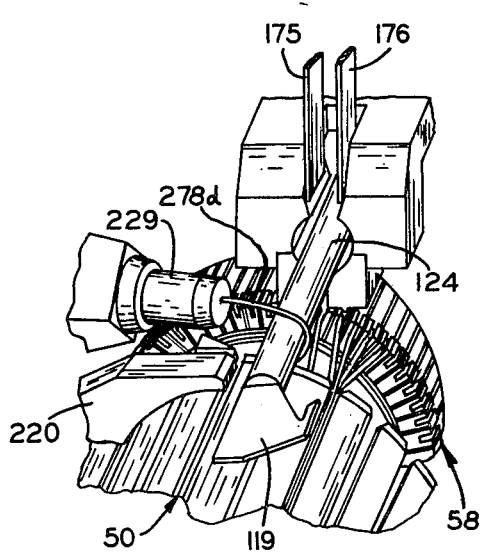
Figure 26G:
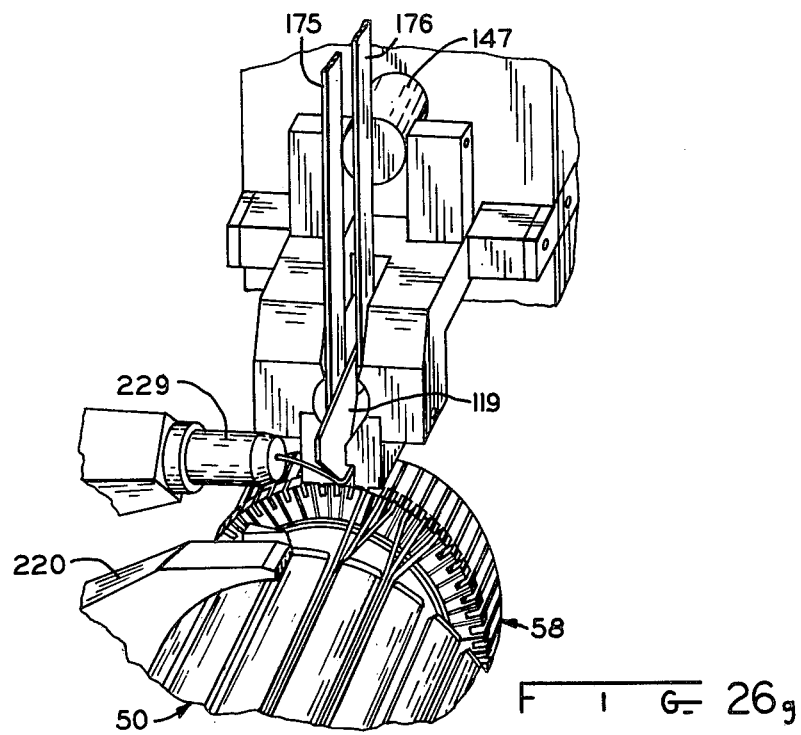

The hook element 119 is now protracted to the position shown in FIG. 26f by actuating the hook cylinder 121. During this protraction, the hook element 119 is rotated 90°, also as shown in FIG. 26f, by the cam 130 (FIGS. 13 and 24) placing the bight 119a of the hook element 119 in line with the section end lead 278d (26f).

Figure 27C:
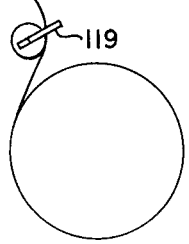
Figure 27D:
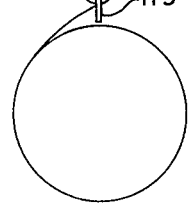

Head cylinder 94 is now actuated to move the rack 95 toward the right (FIGS. 12a and 12b) moving the lead-connecting mechanism 78 clockwise causing the hook rod 124 to engage the side of section lead 278d (also see FIGS. 27b and 27c). The mechanism 78 is stopped in its clockwise movement by the engagement of the rack 95 with the position screw 101, this position corresponding to that shown in FIGS. 28b and 28c which was the last adjusted position of the screw 101.

Figure 25B:
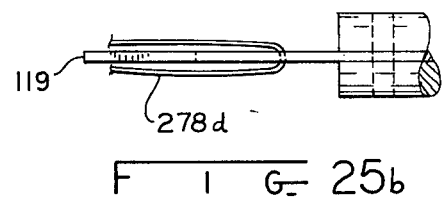

At this point hook cylinder 121 is reversely actuated retracting the hook element 119 into the gripper member 148, this retraction also resulting in the hook element being rotated reversely to its original position before entering the space between gripper blocks 161, 162. Engagement of the hook 119 with the end lead 278d (FIG. 26f) during retraction draws the end lead 278d into the gripper member 148 across the riser 58 to the position shown in FIG. 28d, the end lead 278d lying alongside the hook element 119 as otherwise shown in FIG. 25b (also see FIGS. 21 to 23). As shown more clearly in FIGS. 21 through 23, the end lead 278d has been drawn into the two channels 186 and 187 which lie beneath the gripper block ledges 166 thereby to position both sides of the end lead 278d over the riser slots R-1 and R-2.

At the time the hook cylinder 121 is actuated to retract the hook element 119, the gripper cylinder 143, 144 is actuated to engage gripper blocks 161, 162 with the riser. This forms the guide channels 186 and 187 as continuations of the two respective riser slots R-2 and R-1. As shown in FIG. 28d, the section end 278d on opposite sides of the hook element 119 are now disposed in registry with the two riser slots R-1 and R-2.

Next, blade cylinder 170 (FIGS. 14 and 15) is actuated forcing the left blade 175 downwardly against that portion of the end lead 278d in the guide channel 186. The end edge of this blade 175 is provided with a sharp corner such that the blade now cuts off the wire at the hook element 119 (FIG. 23a). Continued movement of the blade 175 stuffs or stakes the cut lead end, now otherwise denoted in FIG. 28d as E-1, and in FIG. 5 as 68-2 into riser slot R-2, the insulation of the lead being scraped off by engagement with the sides of the slot R-2. An electrical connection is thus made between the lead E-1, 68-2 and the walls of riser slot R-2. The end of this step of inserting the section end E-1 into slot R-2 is shown in FIG. 28e. The remaining portion of the section end lead 278d is denoted in FIG. 28e by the symbol S-2 and in FIG. 23a, this lead being retained in the bight 119a of the hook 119. Otherwise, this lead portion S-2 is positively located in the guide channel 187 (FIG. 23a) and becomes the start lead of the second winding section 70 (FIG. 5).

This completes the winding of coil section 68a (FIG. 5) and connection of the end leads 68-1 and 68-2 (S-1 and S-2) to the riser slots R-1 and R-2 and the respective commutator bars 56. The next operation of the machine involves winding a second coil section 70 (FIG. 5) in the same core slots and connecting the winding section ends to the riser slots R-2 and R-3, respectively. At this point, the appropriate hydraulic cylinders are operated to raise the lefthand blade 175 and the gripper blocks 161, 162. The section lead S-2 is still positioned over slot R-1 as shown in FIG. 28e. The positioning motor 100 is now actuated causing rotation of screw 101 in a direction that forces the rack 95 against the hydraulic pressure within its cylinder 94. The lead-connecting mechanism 78 is now being adjusted slowly counterclockwise and this adjustment continues until the sensor 199, 200 comes into registry with the next commutator slot or insulator strip 59 (FIG. 2). The motor 100 is now stopped leaving the mechanism 78 adjusted to the position shown in FIG. 28f. In this position, section lead S-2, 70-1 is disposed in registry with the riser slot R-2 into which section lead E-1 has already been inserted. Now the cycle explained in connection with the preceeding FIGS. 28a through 28f repeats itself, the beginning being shown in FIG. 28g wherein the lefthand blade 175 is lowered into riser slot R-3, the blade 176 is operated to cut the bight portion off lead 278 at hook element 119 (FIG. 23a) and stake the section lead S-2 into slot R-2 on top of end lead E-1. The winding mechanism is operated to lay three turns of the next coil section 70 into the same core slots following which the winding operation stops and the section ends are connected to the commutator as previously explained. At the end of the winding and the connecting of each coil section, the machine is indexed so as to insert the next succeeding section leads into the appropriate riser slots as otherwise shown in FIG. 28h, the section leads denoted by the letters S-1, E-1 being the leads for the section first wound, the leads S-2, E-2 being of the section wound secondly, and the leads S-3, E-3 being the section wound lastly. The three coil sections 68 (FIG. 5) wound in the same pair of core slots completes the winding of a coil therein.

The next step in machine operation involves the winding of a coil in the next adjacent pair of core slots in the armature core. This is accomplished by withdrawing the armature 50 from the winding shroud 218 and then reinserting it by reciprocal actuation of carriage cylinder 214. This withdrawal is only for a distance of an inch or so until carriage 207 moves into registry with proximity switch 207b. This triggers valve 311 in controlling cylinder 214 to stop carriage 207 and to return it to winding position. During the reinsertion, the fingers 226 and 227 which are biased inwardly toward each other engage the core periphery, the end of finger 226 entering the next core slot as shown in FIGS. 35, 36 and 37 causing rotation of the armature to its adjusted position immediately above the eyelet 229. The finger 227 engages an opposed core slot to prevent the armature from rotating oppositely. This was explained in detail previously. The machine is now in readiness for the winding of another coil and the connection of the leads thereof to the commutator, the starting lead being S-4 on top of the first coil ending lead E-3.

While the machine preferably is automatically controlled to wind the armature, it is to be understood that the various hydraulic cylinders, actuators and motors can be individually controlled manually by means of conventional hand operated valves in proper sequence.

CONTROL SYSTEM

Referring to FIGS. 7, 12a, 13, 15, 31, 33 and 38, the cylinders 121, 94, 143, 170, 171, and 214 are double acting as are the rotary actuators 100 and 288. All with the exception of the cylinders 143, 170 and 171 are controlled by conventional three position solenoid valves indicated by the numerals 309, 305, 310 and 311. Such valves are operated to actuate the respective cylinder or actuator only when signal power is applied thereto, and in the absence of signal power, the valve assumes a neutral position in which the lines leading to the cylinders and actuators are cut off thereby holding the cylinders and actuators in position. As regards the valves 312, 307, 308 connected to the cylinders 143, 170 and 171, these are single acting spring biased valves which actuate the respective cylinders in one direction only when signal power is applied thereto, and in the absence of power, the internal spring moves the valve in a direction that will cause reversing of the respective cylinder.

Figures 44, 45:
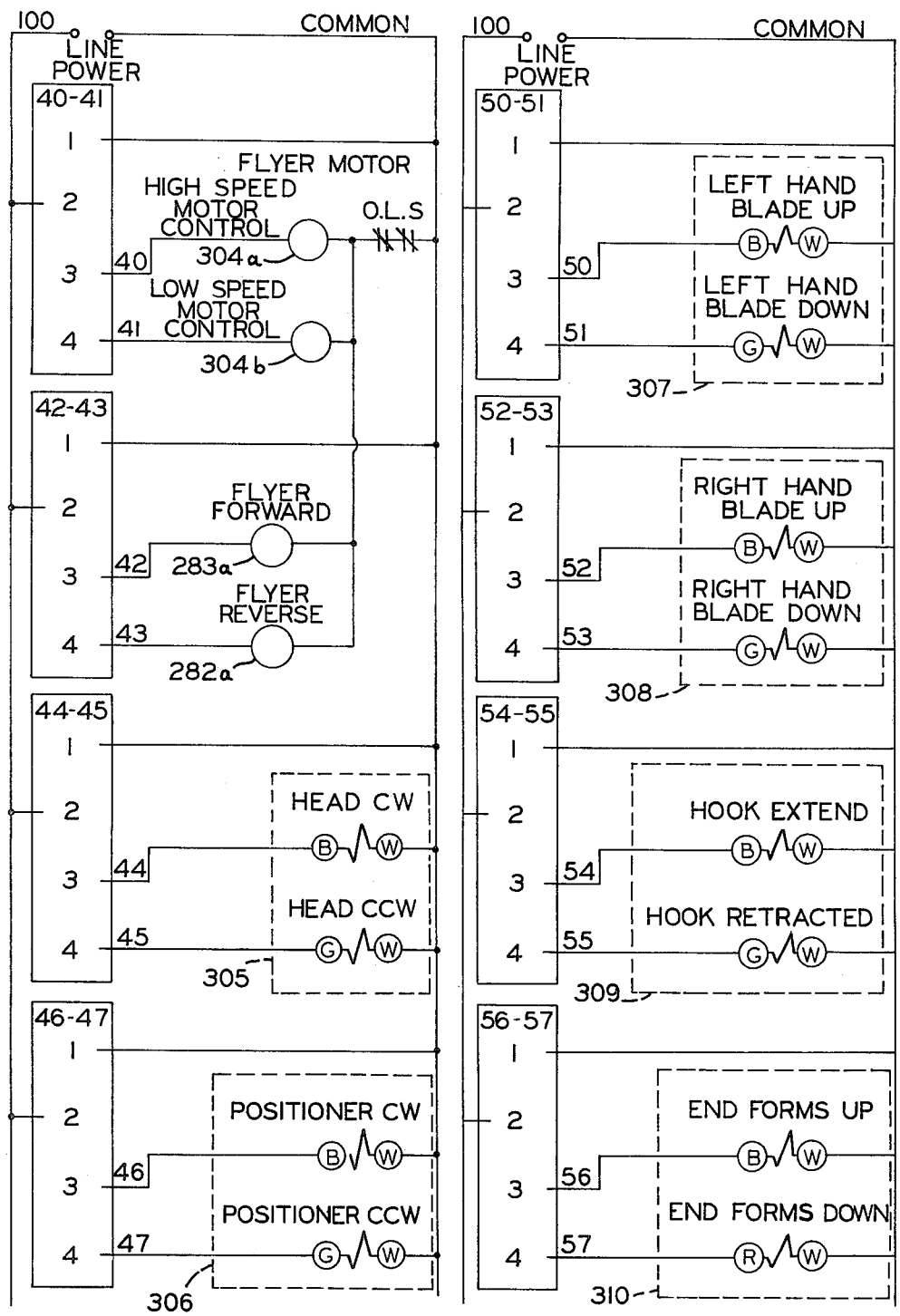

Manual controls may be utilized for operating the various valves, cylinders and actuators in the sequence desired and as explained elsewhere herein. Suitable control circuitry is illustrated in FIGS. 44 through 48 which depict diagrammatically circuit connections to a programmable electronic controller of conventional design as manufactured by Reliance Electric Company, such controller being identified as the Auto Mate Programable Controller. FIGS. 44, 45 and 46 show the electrical connections to the various control valves, flyer or eyelet relays 282a and 283a and the motor control coils 304a and 304b being connected by suitable circuitry to the flyer or eyelet motor 304 (FIG. 38). FIGS. 47, 48 and 49 depict manually operable switches having the functions noted which may be operated in accordance with the machine operations desired as explained elsewhere herein. The normally open switches 208b and 208c in FIGS. 49 when operated activate the electrical circuitry for starting the hydraulic pump (not shown) and to place the circuitry otherwise in condition for performing the various, desired operations. FIGS. 50 and 51 show the circuitry of a system for automatically controlling the operation of the machine for the purpose of completely winding an armature including the connection of the coil leads to the commutator riser. It will be noted that the proximity switches previously described are utilized in this automatic operation.

With respect to the operation of the blade cylinders 170, 171, (FIG. 15) upon the actuation thereof, timing circuitry (not shown) in the controller serves in operating the cylinders 170 and 171 in sequence, first cylinder 170 for a period of time required for the blade 175 to enter its riser slot 70 and at the end of this period cylinder 171 for the purpose of moving its blade 176 into the respective riser slot 60. The same type of timing operation occurs when the rotary actuator 288 (FIG. 31) is actuated to move the arms from the upright position as shown in FIG. 29 downwardly to the horizontal position shown in FIGS. 31, 32, this period of time being sufficiently long to assure that the wire lead from the flyer winder 229 is depressed before it starts winding in the slot in the armature core 51. At the end of the winding cycle, when arm 280 (FIG. 38) registers with proximity switch 282, a circuit deatuates the solenoid 310 causing the arms 286 and 293 to rise to the positions shown in FIG. 29.

Machine operation through a preprogrammed cycle is further depicted in the "step" chart of FIGS. 52a through 52d which identifies the sequence of machine functions in winding an armature having a core with twenty-one slots and a commutator with sixty-three slots with three section coils. The machine functions are preferably controlled by means of the programmable system illustrated in FIGS. 44 through 51.

It is to be understood, however, that other armature designs may be accommodated as well as section and coil patterns wound and connected, the only requirement being that the controller (FIGS. 44-51) be correspondingly programmed.

While the disclosed example of operation connects the sections and coils in series, it is to be understood that two or more sections or coils may be paralleled by controlling operation to lay two sections, for example, in the same core slots and connecting the leads thereof to the same riser slots. This only requires that the same operative steps be repeated once for each paralleled section before proceeding with winding and connecting the next paralleled section.

In recapitulating the specific example, the machine elements at "start" are as follows:

(a) Carriage 207 in load position 207a (FIG. 33).

(b) Lead-connecting mechanism 78 counterclockwise (FIGS. 8, 12).

(c) Hook 119 retracted (FIGS. 13 and 24) with lead 278a, 278d (FIGS. 21-23, 26a, 28a) in right-hand wire guide slot 187 (FIG. 28a).

(d) Eyelet 229 in reversed, back-off position (FIGS. 26a, 31).

(e) Left hand blade 175 up (FIG. 15).

(f) Right hand blade 176 up (FIG. 15).

(g) Gripper 155 up (FIG. 26d).

(h) Positioner screw 101 retracted (FIGS. 12a, 12b; collar 107 moved to be in registry with proximity switch 110).

Referring to FIGS. 52a-52d, a complete cycle of machine operation from beginning to end is shown for winding and connecting one armature. The operating sequences are depicted as individual steps, certain of the steps, such as step 5, including multiple functions in time sharing relationship. With respect to the timing functions, such as in step 5, the controller is programmed accordingly. Also as to the counting functions, as in steps 8, 9, and 10, the controller is likewise programmed.

While there have been described above the principles of this invention in connection with specific apparatus, it is to be clearly understood that this description is made only by way of example and not as a limitation to the scope of the invention.

What is claimed is:

1. In an apparatus for winding the armature of an electric machine, said armature having a slotted core and commutator mounted on a common shaft, said commutator having commutator bars and risers provided with slots, respectively, apparatus comprising:

a supporting frame, means on said frame for supporting an armature in winding position and holding such armature stationary in such position, lead-connecting mechanism carried by said frame adjacent to said supporting and holding means in juxtaposition to the commutator of said armature for locating two coil leads in two preselected ones of said riser slots, respectively, means mounting said armature-supporting and holding means and said mechanism on said stationary frame for independently adjustably rotating each of said supporting and holding means and said mechanism about the axis of said armature, coil-winding mechanism on said frame, for winding a coil on the core of said armature while stationary in said position;

said lead-connecting mechanism including a coil lead guide device having two lead-aligning sections laterally spaced a distance corresponding to the spacing between two adjacent slots in the commutator riser, said lead-aligning sections for a given rotated position of said mechanism being disposed radially opposite said riser with said sections in alignment with two adjacent riser slots, means for locating the two end leads of a coil wound on said core in said lead-aligning sections, respectively, and two lead-inserting devices for selective independent movement into and out of said two riser slots for inserting said coil leads into said slots, respectively.

2. The apparatus of claim 1 wherein said lead-connecting mechanism includes an actuator device connected to said lead-inserting devices for selectively moving the latter into and out of the respective riser slots, and means for rotating and positioning said lead-connecting mechanism relative to said commutator in different predetermined positions which sequentially places said lead-aligning sections and said lead-inserting devices in alignment with different selected riser slots.

3. The apparatus of claim 2 wherein said actuator device includes two actuators, one for each lead-inserting device, which are independently actuable thereby to move said lead-inserting devices selectively, and said coil lead guide device being selectively movable into and out of operative engagement with said riser.

4. The apparatus of claim 3 wherein said lead-connecting mechanism includes a first framework on which said actuators and said locating means are mounted, said framework being mounted on said supporting frame;

said coil-winding mechanism includes a flyer movable in a predetermined path around the core of said armature from end-to-end thereof between coil-starting and coil-ending positions for winding a coil in a slot pair in said core while said core is held stationary, said locating means including a hook element carried by said framework for reciprocation between first and second positions, said first position being between said lead-aligning sections and said second position being adjacent said flyer in its coil-ending position, and said hook element in its first position having opposite sides which define with said lead-aligning sections two lead-guiding channels in radial alignment with two adjacent riser slots.

5. The apparatus of claim 4 wherein said locating means includes a motor device mounted on said framework for reciprocating said hook element, a cam element operatively connected to said hook element for rotating the latter in one direction through a predetermined angle when moving from said first to said second positions and for rotating it in reverse from said second to said first positions.

6. The apparatus of claim 4 wherein said coil lead guide device includes a bifurcated gripper block pivotally mounted on said framework for selective movement into and out of engagement with said riser, the furcations of said gripper block serving as said lead-aligning sections and said hook element being disposed between said furcations.

7. The apparatus of claim 6 wherein said actuators are reciprocable insert-device power cylinders, a reciprocable gripper power cylinder carried by said framework and connected to said gripper block for pivoting the latter into and out of engagement with the riser.

8. The apparatus of claim 7 wherein said armature-supporting means is fixedly mounted on said supporting frame and said framework is mounted on said supporting frame for rotatable movement about the axis of said armature, and said positioning means including an actuating device mounted on said frame and connected to said framework for selectively rotating the latter.

9. The apparatus of claim 5 wherein said armature-supporting means is fixedly mounted on said supporting frame and said framework is mounted on said supporting frame for rotatable movement about the axis of said armature, and said positioning means including an actuating device mounted on said frame and connected to said framework for selectively rotating the latter, said framework including spaced apart frame elements rotatably mounted on a stationary shaft on said supporting frame, said motor device being mounted on one of said frame elements, and said cam element being fixedly mounted on said framework.

10. The apparatus of claim 9 wherein said actuating device includes a gear segment operatively connected to said frame elements, a reciprocable rack power cylinder on said frame having a rack connected thereto which engages said gear segment whereby reciprocation of said rack power cylinder causes corresponding rocking motion of said framework, a rotary power cylinder and a positioning screw on said frame, said screw being threadedly carried by said frame for both rotary and longitudinal movement, said screw further having a rotary drive connection with said rotary power cylinder, and said screw and rack being in longitudinal alignment with the adjacent ends being selectively engageable whereby engagement of such ends serves to position said rack and in turn the rotated position of said framework.

11. The apparatus of claim 9 including a pair of spaced parallel elongated guide bars extending parallel to said stationary shaft and fixed at the opposite ends thereof to said frame elements, a connecting block slidably mounted for reciprocating movement on said guide bars, and a connecting rod connected between said connecting block and said hook element whereby reciprocation of said block causes reciprocation of said hook element.

12. The apparatus of claim 7 wherein said two lead-inserting devices are spaced elongated blades which are generally parallel and extend radially outwardly from said commutator riser, said two insert-device power cylinders having piston rods connected to the outer ends, respectively, of said blades whereby reciprocation of said piston rods causes reciprocation of said blades radially of said riser, said piston rods being reciprocable between inner and outer positions, said inner positions disposing the inner ends of said blades within respective riser slots, said outer positions disposing said inner blade ends radially spaced from said riser, said two blades further being received by said two lead-guiding channels, respectively, whereby coil leads within said channels may be engaged by the inner blade ends and forced into said respective riser slots.

13. The apparatus of claim 12 wherein each of said lead-guiding channels is of a size which slidably receives a coil lead and further is a radial extension of a riser slot.

14. The apparatus of claim 13 wherein the two furcations of said gripper block have facing inclined ramp portions which merge with respective sides of said lead-guiding channels, the inner ends of said blades being engageable with said ramp portions in the movement thereof from said outer to said inner positions for guiding said inner ends into the respective channels and riser slots.

15. The apparatus of claim 14 wherein said blades are yieldably connected to said piston rods, respectively, whereby said blades may be movably guided by said ramps and channels, respectively, into said riser slots.

16. The apparatus of claim 15 wherein each said yieldable connection of a blade to its piston rod includes a guide rod secured at one end to the framework of said lead-connecting mechanism such that said guide rod extends parallel to said piston rod, a blade-carrying block slidably mounted on said guide rod, a spring biased plunger movably carried by said blade-carrying block and extending transversely of said piston rod, said outer end of said blade being mounted on said plunger which yieldably moves under lateral deflection of said blade.

17. The apparatus of claim 16 wherein said framework of said lead-connecting mechanism includes a head block, said blade cylinders and said guide rods being fixedly secured to said head block, said gripper cylinder being disposed within said head block and extending transversely of said piston rods, said gripper block being in the form of a crank pivoted to said head block at the angle thereof, one arm of said gripper block carrying said furcations and the other arm thereof being pivotally connected to the piston rod of said gripper cylinder whereby reciprocation of said gripper cylinder serves to pivot said gripper block into and out of engagement with said riser.

18. The apparatus of claim 1 wherein said coil-winding mechanism includes a flyer movable in a predetermined path around the core of said armature from end-to-end thereof between coil-starting and coil-ending positions for winding a coil in a slot pair in said core, and including
coil lead-forming means for depressing a coil lead extending from said flyer to said riser radially toward the shaft of said armature.

19. The apparatus of claim 18 wherein said coil lead-forming means includes an arm mounted on said stationary frame for pivoted movement between first and second positions, said first position being spaced from said armature, said second position being adjacent the shaft of said armature at a location between said core and commutator, said arm in said second position also extending transversely of said shaft whereby a coil lead extending from said flyer to said riser will be radially depressed.

20. The apparatus of claim 18 including coil lead-guiding means for guiding a coil lead extending from said flyer to said riser into a core slot when said flyer starts its winding movement from said coil-starting position.

21. The apparatus of claim 20 wherein said coil lead-guiding means includes an arm mounted on said stationary frame for pivotal movement between first and second positions, said first position being spaced from said armature, said second position being adjacent the commutator end of said core, said arm in said second position also extending transversely of said armature shaft with the distal end thereof being disposed adjacent and further defining a core slot and forming an extension of one edge of the core slot.

22. The apparatus of claim 1 wherein said coil-winding mechanism includes a flyer movable in a predetermined path around the core of said armature from end-to-end thereof between coil-starting and coil-ending positions for winding a coil in a slot pair in said core, said path being generally oblate having opposed sides which are essentially straight and parallel to the axis of said armature and opposed ends which are curved outwardly and rearwardly away from the armature shaft, said straight sides being parallel to the armature axis and in winding alignment with a pair of core slots.

23. The apparatus of claim 22 wherein said armature-supporting means includes means for locating said armature relative to said flyer in first and second positions, said first position being in winding registry with said flyer, said second position being spaced from said first position, and
means for incrementally rotating said armature about its axis upon movement from said second to said first positions an increment which positions a different pair of core slots in registry with said flyer.

24. The apparatus of claim 23 wherein said armature-locating means includes a shroud engageable with said core when said armature-locating means is in said first position, a first flyer shaft operatively mounted on said stationary frame, said flyer being carried by said shaft for rotation thereby, a barrel cam rotatably mounted on said frame and operatively engaged with said flyer shaft for reciprocating the latter to provide the flyer movement corresponding to said opposed path ends, a second flyer shaft coaxial with respect to said first flyer shaft and operatively connected thereto for rotation relative thereto, an eccentric carried by said second shaft for rotation therewith, and means connecting said eccentric to said flyer for providing the flyer movement corresponding to said opposed path sides.

25. The apparatus of claim 24 wherein the operative connections between said barrel cam and said first flyer shaft and between said first and second flyer shafts includes a gear train in a unitary assembly engageable with said barrel cam for reciprocation thereby, and rotary means for imparting rotation to the gears within said gear train.

26. The apparatus of claim 6 wherein said gripper block has a holding portion which operatively engages said riser, said holding portion having two projecting teeth spaced apart circumferentially of said riser and adapted to engage the two riser lands, respectively, remote from but adjacent to said two adjacent slots thereby to reinforce said lands during insertion of leads into either or both of said adjacent slots.

27. The apparatus of claim 1 wherein said lead-connecting mechanism includes means for reinforcing the lands of said two adjacent riser slots during insertion of leads thereinto.

28. For use in apparatus for winding the armature of an electric machine, said armature having a slotted core and commutator mounted on a common shaft, said commutator having commutator bars and risers provided with slots, respectively,
apparatus comprising a supporting frame, means on said frame for supporting an armature in winding position, lead-connecting mechanism carried by said frame adjacent to said supporting means in juxtaposition to the commutator for locating two coil leads in two riser slots, respectively,
said lead-connecting mechanism including a coil lead guide device having two lead-aligning sections laterally spaced a distance corresponding to the spacing between two adjacent slots in the commutator riser, said lead-aligning sections being disposed radially opposite said riser with said sections in alignment with two adjacent riser slots, means for locating the two end leads of a coil wound on said core in said lead-aligning sections, respectively, two lead-inserting devices for independent selective movement into and out of said two riser slots for inserting said coil leads into said slots, respectively,
a framework on said frame which carries said locating means,
said locating means including a hook element carried by said framework for reciprocation in a direction parallel to the axis of said armature between first and second positions, said first position being between said lead-aligning sections, said hook element in its first position having opposite sides which define with said lead-aligning sections two lead-guiding channels in radial alignment with two adjacent riser slots, and said second position being spaced from said first position and adjacent to the armature core.

29. The apparatus of claim 28 wherein said coil lead guide device includes a bifurcated gripper block pivotally mounted on said framework for selective movement into and out of engagement with said riser, the furcations of said gripper block serving as said lead-aligning sections and said hook element being disposed between said furcations.

30. The apparatus of claim 29 wherein said two lead-inserting devices are spaced elongated blades which are generally parallel and extend radially outwardly from said commutator riser, said blades being independently longitudinally reciprocable between inner and outer positions, said inner positions disposing the inner ends of said blades within respective riser slots, said outer positions disposing said inner blade ends radially spaced from said riser, said two blades further being received by said two lead-guiding channels, respectively, whereby coil leads within said channels may be engaged by the inner blade ends and forced into said respective riser slots.

31. The apparatus of claim 30 wherein said inner ends of said blades have transverse lead cut-off edges, said hook element having a bight adapted to retain a U-shaped coil lead portion disposed within said two channels, respectively, movement of said blades from said outer to said inner positions causing said cut-off edges to cut off said leads on opposite sides of said hook element leaving as waste only the bight portion of said U-shaped coil lead portion.

32. The apparatus of claim 31 wherein said gripper block has a holding portion which operatively engages said riser, said holding portion having two projecting teeth spaced apart circumferentially of said riser and adapted to engage the two riser lands, respectively, remote from but adjacent to said two adjacent slots thereby to reinforce said lands during insertion of leads into either or both of said adjacent slots.

33. The apparatus of claim 29 wherein said gripper block has a holding portion which operatively engages said riser, said holding portion having two projecting teeth spaced apart circumferentially of said riser and adapted to engage the two riser lands, respectively, remote from but adjacent to said two adjacent slots thereby to reinforce said lands during insertion of leads into either or both of said adjacent slots.

34. For use in apparatus for winding the armature of an electric machine, said armature having a slotted core and commutator mounted on a common shaft, said commutator having commutator bars and risers provided with slots, respectively, apparatus comprising a supporting frame, means on said frame for supporting an armature in winding position, lead-connecting mechanism carried by said frame adjacent to said supporting means in juxtaposition to the commutator for locating two coil leads in two riser slots, respectively, said lead-connecting mechanism including a coil lead guide device having two lead-aligning sections laterally spaced a distance corresponding to the spacing between two adjacent slots in the commutator riser, said lead-aligning sections being disposed radially opposite said riser with said sections in alignment with two adjacent riser slots, means for locating the two end leads of a coil wound on said core in said lead-aligning sections, respectively, two elongated flat lead-inserting blades for independent selective movement into and out of said riser slots for inserting said coil leads into said slots, said mechanism including a hook element reciprocable between first and second positions, said first position being between said lead-aligning sections and said second position being adjacent to said core, said hook element in its first position having opposite flat sides which define with said lead-aligning sections two lead-guiding channels in radial alignment with two adjacent riser slots, the inner ends of said blades having transverse lead cut-off edges, said hook element having a bight adapted to retain a U-shaped coil lead portion disposed within said two channels, respectively, movement of said blades from outer to inner positions causing said cut-off edges to cut off said leads on opposite sides of said hook element leaving as waste only the bight portion of said U-shaped coil lead portion, said cut-off edges moving past said hook element during lead cut off.

* * * * *

UNITED STATES PATENT AND TRADEMARK OFFICE
CERTIFICATE OF CORRECTION

PATENT NO. : 4,366,618
DATED : January 4, 1983
INVENTOR(S) : Lee J. Lakes

It is certified that error appears in the above—identified patent and that said Letters Patent is hereby corrected as shown below:

Col. 2, line 33, change "preceeding" to --proceeding--.

Col. 2, line 61, change "preceding" to --proceeding--.

Col. 2, line 64, change "preceding" to --proceeding--.

Col. 6, line 24, change "11" to --111--.

Col. 6, line 35, change "acuates" to --actuates--.

Col. 6, line 38, change "accomodating" to --accommodating--.

Col. 6, line 52, change "accomodating" to --accommodating--.

UNITED STATES PATENT AND TRADEMARK OFFICE
CERTIFICATE OF CORRECTION

PATENT NO. : 4,366,618          Page 2 of 4
DATED : January 4, 1983
INVENTOR(S) : Lee J. Lakes It is certified that error appears in the above—identified patent and that said Letters Patent is hereby corrected as shown below:

Col. 7, line 12, change "95" to --94--.

Col. 8, line 47, change "hood" to --hook--.

Col. 10, line 16, change "reciptrocate" to --reciprocate--.

Col. 10, line 31, change "cyliners" to --cylinders--.

Col. 11, line 2, change "accomodated" to --accommodated--.

Col. 11, line 45, change "sensed" to --secured--.

Col. 13, line 5, change "50" to --51--.

UNITED STATES PATENT AND TRADEMARK OFFICE
CERTIFICATE OF CORRECTION

PATENT NO. : 4,366,618

DATED : January 4, 1983

INVENTOR(S) : Lee J. Lakes

It is certified that error appears in the above—identified patent and that said Letters Patent is hereby corrected as shown below:

Col. 13, line 58, change "suitable" to --suitably--.

Col. 15, line 46, change "particulary" to --particular--.

Col. 15, line 48, change "22" to --222--.

Col. 16, line 12, change "incorporation" to --incorporating--.

Col. 16, line 27, delete "(".

Col. 17, line 25, change "the" to --this--.

Col. 17, line 54, change "is" to --in--.

UNITED STATES PATENT AND TRADEMARK OFFICE
CERTIFICATE OF CORRECTION

PATENT NO. : 4,366,618

DATED : January 4, 1983

INVENTOR(S) : Lee J. Lakes

It is certified that error appears in the above—identified patent and that said Letters Patent is hereby corrected as shown below:

Col. 19, line 25, delete "the".

Col. 21, lines 48 and 49, change "preceeding" to --proceeding--.

Col. 22, line 66, change "Figs" to --Fig.--.

Col. 23, line 14, change "70" to --60--.

Col. 23, line 25, change "deatuates" to --deactuates--.

Signed and Sealed this

Fourteenth Day of June 1983

[SEAL]

Attest:

DONALD J. QUIGG

Attesting Officer

Acting Commissioner of Patents and Trademarks